United States Patent
Faith

(10) Patent No.: US 10,445,401 B2
(45) Date of Patent: Oct. 15, 2019

(54) SYSTEMS AND METHODS FOR CONVERTING DISCRETE WAVELETS TO TENSOR FIELDS AND USING NEURAL NETWORKS TO PROCESS TENSOR FIELDS

(71) Applicant: Deep Labs Inc., San Francisco, CA (US)

(72) Inventor: Patrick Faith, Pleasanton, CA (US)

(73) Assignee: Deep Labs Inc., San Francisco, CA (US)

( * ) Notice: Subject to any disclaimer, the term of this patent is extended or adjusted under 35 U.S.C. 154(b) by 0 days.

(21) Appl. No.: 15/892,407

(22) Filed: Feb. 8, 2018

(65) Prior Publication Data
US 2019/0243869 A1 Aug. 8, 2019

(51) Int. Cl.
| G06F 17/10 | (2006.01) |
| G06F 11/00 | (2006.01) |
| G06F 17/14 | (2006.01) |
| G06N 3/08 | (2006.01) |
| G06N 3/04 | (2006.01) |

(52) U.S. Cl.
CPC ......... *G06F 17/148* (2013.01); *G06N 3/0454* (2013.01); *G06N 3/08* (2013.01)

(58) Field of Classification Search
USPC .......................................................... 702/66
See application file for complete search history.

(56) References Cited

U.S. PATENT DOCUMENTS

| 2011/0191076 A1* | 8/2011 | Maeda | G05B 23/0254 703/2 |
| 2012/0041575 A1* | 2/2012 | Maeda | G05B 23/024 700/80 |
| 2013/0121554 A1* | 5/2013 | Liu | G06T 11/005 382/131 |
| 2013/0191309 A1* | 7/2013 | Lakshminarayan | G06F 17/148 705/36 R |

* cited by examiner

Primary Examiner — Paul D Lee
(74) Attorney, Agent, or Firm — Finnegan, Henderson, Farabow, Garrett & Dunner, LLP

(57) ABSTRACT

The present disclosure relates to systems and methods for detecting and identifying anomalies within a discrete wavelet database. In one implementation, the system may include one or more memories storing instructions and one or more processors configured to execute the instructions. The instructions may include instructions to receive a new wavelet, convert the net transaction to a wavelet, convert the wavelet to a tensor using an exponential smoothing average, calculate a difference field between the tensor and a field having one or more previous transactions represented as tensors, perform a weighted summation of the difference field to produce a difference vector, apply one or more models to the difference vector to determine a likelihood of the new wavelet representing an anomaly, and add the new wavelet to the field when the likelihood is below a threshold.

20 Claims, 18 Drawing Sheets

SYSTEMS AND METHODS FOR CONVERTING DISCRETE WAVELETS TO TENSOR FIELDS AND USING NEURAL NETWORKS TO PROCESS TENSOR FIELDS

TECHNICAL FIELD

The present disclosure relates generally to the field of neural networks. More specifically, and without limitation, this disclosure relates to systems and methods for using neural networks to process discrete tensor fields.

BACKGROUND

Extant methods of risk detection rely on rule-based determinations, decision trees, or artificial neural networks. However, each extant method suffers from shortfalls. For example, rule-based determinations tend to have high error rates, which are inconvenient for financial markets. Although decision trees may have lower error rates than rule-based determinations, they often rely on manual verification along one or more branches, as well as increasing complexity and processing resources. Finally, artificial neural networks fail to recognize many patterns and exponentially increase resource drain as the number of hidden neuron layers increases linearly.

Moreover, extant rules, trees, and neural networks must be implemented separately. This both reduces processing efficiency and requires further resource drain and algorithmic complexity to handle disparate results from the rules, trees, and networks.

Additionally inefficiencies inhere in the storage of discrete data representing transactions. This discrete data is generally stored in a relational database or a graph database. The former relies on resource-costly searches and concatenations while the latter relies on exponentially costly nodal traversals.

SUMMARY

In view of the foregoing, embodiments of the present disclosure provide systems and methods for constructing and using wavelet databases to predict risk through neural networks.

As used herein, "database" refers to a "data space," which is a tertiary database that uses in-process RAM dictionaries, a shared memory data cache, a multi-process/multi-server object cache, and one or more common databases (e.g., a Structured Query Language (SQL) database) and/or Binary Large Objects (BLOBs).

According to an example embodiment of the present disclosure, a system for detecting anomalies within a database comprising discrete wavelets may comprise one or more memories storing instructions and one or more processors configured to execute the instructions. The instructions may include instructions to receive a new wavelet, convert the wavelet to a tensor using an exponential smoothing average, calculate a difference field between the tensor and a field having one or more previous wavelets represented as tensors, perform a weighted summation of the difference field to produce a difference vector, apply one or more models to the difference vector to determine a likelihood of the new wavelet representing an anomaly, and add the new wavelet to the field when the likelihood is below a threshold.

In another embodiment, a system for training a deep field network to detect anomalies within a database comprising discrete wavelets may comprise one or more memories storing instructions and one or more processors configured to execute the instructions. The instructions may include instructions to receive a plurality of transactions, convert each transaction to a corresponding wavelet, group the plurality of wavelets and corresponding tensors by coefficients included in the wavelets, train a neural network for each group independently of other groups, and integrate the neural networks into a deep field network.

In another embodiment, a system for authorizing a transaction using cascading discrete wavelets may comprise one or more memories storing instructions and one or more processors configured to execute the instructions. The instructions may include instructions to receive a new transaction, convert the new transaction to a wavelet, convert the wavelet to a tensor using an exponential smoothing average, calculate a difference field between the tensor and a field having one or more previous transactions represented as tensors, perform a weighted summation of the difference field to produce a difference vector, apply one or more models to the difference vector to determine a likelihood of the transaction being high risk, and authorize the new transaction when the likelihood is below a threshold.

Any of the alternate embodiments for disclosed systems for indexing and restructuring a headshot database for a user may apply to disclosed non-transitory computer-readable media storing instructions for indexing and restructuring a headshot database for a user.

It is to be understood that the foregoing general description and the following detailed description are exemplary and explanatory only, and are not restrictive of the disclosed embodiments.

Further, by employing the unconventional training disclosed herein, a deep field network may be trained to function with greater efficiency and accuracy than extant neural networks as well as trained to operate on a wavelet database rather than a relational or graph database. In addition, by employing the unconventional deep field network disclosed herein, more accurate and efficient detection of anomalies may be performed than by using extant rule-based systems, decision trees, or neural networks.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

Figure 1:
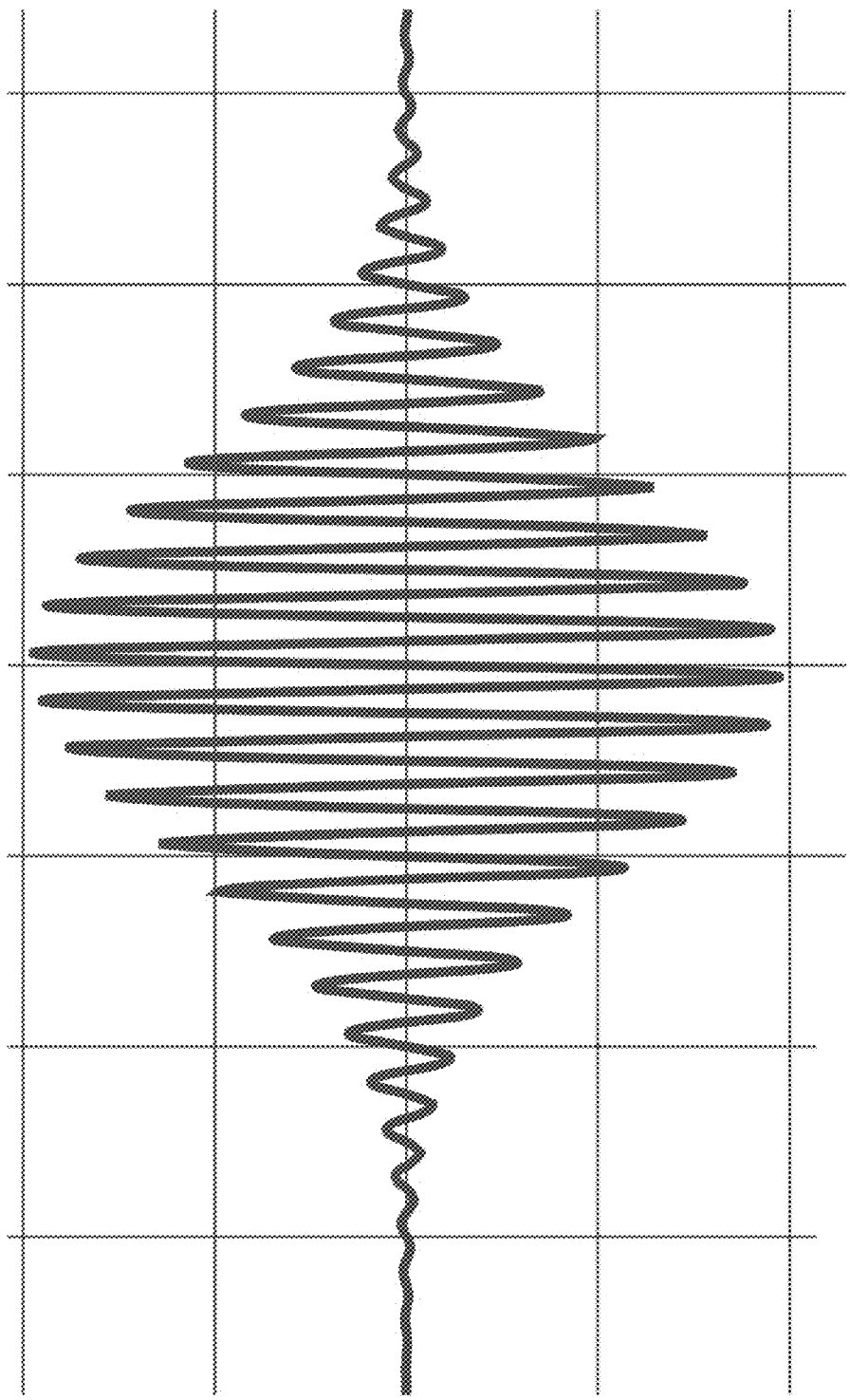
FIG. 1 is a diagram of a wavelet, according to an exemplary embodiment of the present disclosure.

The disclosed embodiments relate to systems and methods for detecting anomalies within a database comprising discrete wavelets, training a deep field network to detect anomalies within a database comprising discrete wavelets, and authorizing a transaction using cascading discrete wavelets. Embodiments of the present disclosure may be implemented using a general-purpose computer. Alternatively, a special-purpose computer may be built according to embodiments of the present disclosure using suitable logic elements.

As used herein, "deep field network" refers to one or more trained algorithms integrated into a prediction schema. In some embodiments, deep field networks may be applied to a multi-nodal manifold converted differential field, e.g., determined based on the difference between a wavelet converted to a tensor and a field of existing (e.g., previous) tensors.

Disclosed embodiments allow for efficient and accurate detection of anomalies within a wavelet database. Additionally, embodiments of the present disclosure allow for efficient and accurate authorization of transactions using a wavelet database. Furthermore, embodiments of the present disclosure provide for greater flexibility and accuracy than extant anomaly detection techniques, such as rule-based determinations, decision trees, and neural networks.

According to an aspect of the present disclosure, a processor may receive a new wavelet. As used herein, the term "wavelet" refers to any data that may be represented as a brief oscillation. The wavelet need not be received in the form of an oscillation but may be represented in any appropriate form (e.g., an array, a digital signal, or the like). The wavelet may be received from one or more memories (e.g., a volatile memory such as a random access memory (RAM) and/or a non-volatile memory such as a hard disk) and/or across one or more computer networks (e.g., the Internet, a local area network (LAN), or the like). Alternatively, the processor may receive data and convert the data into a wavelet. For example, the processor may receive a transaction having associated properties (such as time, location, merchant, amount, etc.) and may convert the transaction into a wavelet or into an array or other format that represents a wavelet.

The processor may convert the wavelet to a tensor. For example, a tensor may represent an array that satisfies one or more mathematical rules (for example, a tensor may be a multi-dimensional array with respect to one or more valid bases of a multi-dimensional space).

In some embodiments, the processor may convert the wavelet to a tensor using a moving average. For example, a simple moving average, a cumulative moving average, a weighted moving average, or the like, may be used to convert the wavelet to a tensor. In certain aspects, the processor may convert the wavelet to a tensor using an exponential smoothing average. By using an exponential smoothing average, the natural base e may be incorporated into the smoothing. Because e represents the limit of compound interest, the smoothed wavelet may be easier to identify as anomalous within a financial market. Accordingly, the processor may perform a discrete wavelet transform with an exponential smoothing average accumulator to transform the received wavelet into a tensor.

The processor may calculate a difference field between the tensor and a field having one or more previous wavelets represented as tensors. For example, the field may have been previously constructed as explained above. That is, the processor may perform a discrete wavelet transform with an exponential smoothing average accumulator to transform the one or more previous wavelets into tensors. The processor may then obtain the field by mapping the tensors onto a manifold (e.g., a differential manifold). One or more atlases may be used in order to do so. Alternatively, the processor may receive the tensors (e.g., from one or more memories and/or over one or more computer networks) and construct the field therefrom or may receive the field directly (e.g., from one or more memories and/or over one or more computer networks).

In some embodiments, the difference field may represent a tensor product of fields (i.e., between a field having only the tensor and the field having the one or more previous wavelets represented as tensors). Accordingly, the difference field may represent a Galois connection between the tensor and the field.

The processor may perform a weighted summation of the difference field to produce a difference vector. For example, the coefficient weights may be derived from training of one or more particular models. For example, the processor may apply a variety of models in the weighting, such as models trained for particular identifiers (e.g., particular accounts, particular persons, particular merchants, particular institutions, etc.), particular times (e.g., time of day, time of year, etc.), particular locations (e.g., particular country, particular city, particular postal code, etc.), or the like.

Additionally or alternatively, the summation may include a notch filter. Accordingly, particular frequencies may be filtered out during the summation. For example, the processor may apply one or more particular models to determine which particular frequencies to filter out. The one or more filter models may be the same models as the one or more weighting models or may be different models.

In some embodiments, an absolute or a squaring function may be applied. Alternatively, the weighted summation may produce a directional difference vector. Accordingly, the difference vector may include a direction of the difference as well as a magnitude of the difference. This additional information may improve accuracy of the anomaly detection. For example, a large difference vector pointing in an expected direction may be less anomalous than a small difference vector pointing in an unexpected direction.

The processor may apply one or more models to the difference vector to determine a likelihood of the new wavelet representing an anomaly. For example, the one or more likelihood models may be the same models as the one or more filter models and/or the one or more weighting models or may be different models. In embodiments having direction as well as magnitude, the one or more models may use the magnitude and direction of the difference vector to determine the likelihood. As used herein, "likelihood" may refer to a percentage (e.g., 50%, 60%, 70%, etc.), a set of odds (e.g., 1:3, 1 in 5, etc.), a score (e.g., 1 out of 5, 5.6 out of 10.0, etc.), an indicator (e.g., "not likely," "likely," "very likely," etc.), or the like.

Based on the likelihood, the processor may either add the new wavelet to the field or reject the new wavelet. For example, the processor may add the new wavelet to the field when the likelihood is below a threshold. If the processor rejects the new wavelet, the processor may send a notification to such effect. For example, the processor may send a rejection signal or a message indicating the likelihood and/or a reason (e.g., based on the one or more models) for rejection. The processor may send the notification to one or more parties associated with the new wavelet (e.g., a financial institution, an individual, a merchant, or the like) and/or to one or more computer systems from which the new wavelet was received (e.g., a personal computer such as a desktop computer or mobile phone, a point-of-service system, a financial processing server, a credit bureau server, or the like).

According to a second aspect of the present disclosure, a processor may receive a plurality of transactions. As used herein, the term "transactions" refers to any data including an indication of an amount of currency or commodity that is transferred between parties. The transactions need not be received in any particular format but may be represented in any appropriate form such as arrays, digital signals, or the like. The transactions may be received from one or more memories (e.g., a volatile memory such as a random access memory (RAM) and/or a non-volatile memory such as a hard disk) and/or across one or more computer networks (e.g., the Internet, a local area network (LAN), or the like). Alternatively, the processor may receive raw data and convert the data into a format representing a transaction. For example, the processor may receive a data with time, location, party identifiers, amount, and the like and may convert this data into a single bundle representing a transaction.

The processor may convert each transaction to a corresponding wavelet. For example, as explained above, the processor may receive a transaction having associated properties (such as time, location, merchant, amount, etc.) and may convert the transaction (along with its associated properties) into a wavelet or into an array or other format that represents a wavelet.

The processor may group the plurality of wavelets and corresponding tensors by coefficients included in the wavelets. For example, the corresponding tensors may be determined using an exponential smoothing average. That is, the processor may perform a discrete wavelet transform with an exponential smoothing average accumulator to transform the wavelets into corresponding tensors.

Because each tensor includes coefficients for each base in the set of bases representing a corresponding multi-dimensional space in which the tensor may be represented, the processor may group the tensors (and therefore, the corresponding wavelets) by these coefficients. Because the coefficients depend on the bases selected (which must satisfy one or more mathematical rules in order to form a mathematically consistent multi-dimensional space), the processor may generate a plurality of groups of coefficients and, thus, a plurality of groupings of the tensors (with the corresponding wavelets). For example, the processor may select bases depending on which factors are most heavily weighted in one or more models and then perform a plurality of groupings, each for a particular model (or set of models) having factors corresponding to the bases used to determine the corresponding grouping.

The processor may train a neural network for each group independently of other groups. Although "neural network" usually refers to a traditional artificial neural network as depicted, for example, in FIG. 9, the processor here may train any model (e.g., the models discussed above with respect to the groupings) that produces a likelihood of a particular tensor being anomalistic within a group. By training each group independently, the processor may develop specialized models that are orders of magnitude greater in number (and, therefore, accuracy) than extant neural networks. For example, the processor may develop thousands (or even millions) of models without requiring exponentially more resources than used to construct a single artificial neural network.

The processor may integrate the neural networks into a deep field network. For example, the models may be combined into a larger predictive scheme. In one particular example, the models may be combined such that when a new tensor is convolved (or otherwise combined with the models), the model trained on the group (or groups) having the most similar coefficients will be amplified while other models (e.g., trained on groups with less similar coefficients) will be minimized.

According to a third aspect of the present disclosure, a processor may receive a new transaction. For example, as explained above, the term "transaction" refers to any data including an indication of an amount of currency or commodity that is transferred between parties. The transaction need not be received in any particular format but may be represented in any appropriate form such as arrays, digital signals, or the like. The transaction may be received from one or more memories (e.g., a volatile memory such as a random access memory (RAM) and/or a non-volatile memory such as a hard disk) and/or across one or more computer networks (e.g., the Internet, a local area network (LAN), or the like). Alternatively, the processor may receive raw data and convert the data into a format representing a transaction. For example, the processor may receive a data with time, location, party identifiers, amount, and the like and may convert this data into a single bundle representing a transaction.

The processor may convert the new transaction to a wavelet. For example, as explained above, the new transaction may have associated properties (such as time, location, merchant, amount, etc.), and the processor may convert the new transaction (along with its associated properties) into a wavelet or into an array or other format that represents a wavelet.

The processor may convert the wavelet to a tensor using an exponential smoothing average. For example, as explained above, the processor may perform a discrete wavelet transform with an exponential smoothing average accumulator to transform the wavelet into a corresponding tensor.

The processor may calculate a difference field between the tensor and a field having one or more previous transactions represented as tensors. For example, as explained above, the processor may have performed a discrete wavelet transform with an exponential smoothing average accumulator to transform the one or more previous transactions into tensors. The processor may then obtain the field by mapping the tensors onto a manifold (e.g., a differential manifold). One or more atlases may be used to map the tensors onto the manifold. Alternatively, the processor may receive the tensors (e.g., from one or more memories and/or over one or more computer networks) and construct the field therefrom or may receive the field directly (e.g., from one or more memories and/or over one or more computer networks).

The processor may perform a weighted summation of the difference field to produce a difference vector. For example, as explained above, the coefficient weights may be derived from training of one or more particular models. For example, the processor may apply a variety of models in the weighting, such as models trained for particular identifiers (e.g., particular accounts, particular persons, particular merchants, particular institutions, etc.), particular times (e.g., time of day, time of year, etc.), particular locations (e.g., particular country, particular city, particular postal code, etc.), or the like.

Additionally or alternatively, the summation may include a notch filter. Accordingly, particular frequencies may be filtered out during the summation. For example, the processor may apply one or more particular models to determine which particular frequencies to filter out. The one or more filter models may be the same models as the one or more weighting models or may be different models.

The processor may apply one or more models to the difference vector to determine a likelihood of the transaction being high risk. For example, the one or more likelihood models may be the same models as the one or more filter models and/or the one or more weighting models or may be different models. In embodiments having direction as well as magnitude, the one or more models may use the magnitude and direction of the difference vector to determine the likelihood. As used herein, "likelihood" may refer to a percentage (e.g., 50%, 60%, 70%, etc.), a set of odds (e.g., 1:3, 1 in 5, etc.), a score (e.g., 1 out of 5, 5.6 out of 10.0, etc.), an indicator (e.g., "not likely," "likely," "very likely," etc.), or the like.

As used herein, "risk" refers to any quantification of the probability of a transaction being lost (e.g., via automatic decline, insolvency of the purchaser, fraudulency, or the like). Accordingly, "high risk" refers to any level of risk that exceeds an acceptable level, whether the acceptable level be predetermined or dynamically determined (e.g., certain purchasers, merchants, regions, times of day, or the like may have differing acceptable levels of risk).

Based on the likelihood, the processor may authorize or deny the new transactions. For example, the processor may authorize the new transaction when the likelihood is below a threshold. If the processor rejects the new wavelet, the processor may send a notification to such effect. For example, the processor may send a rejection signal or a message indicating the likelihood and/or a reason (e.g., based on the one or more models) for rejection. The processor may send the notification to one or more parties associated with the new transaction (e.g., a financial institution, an individual, a merchant, or the like) and/or to one or more computer systems from which the new transaction was received (e.g., a personal computer such as a desktop computer or mobile phone, a point-of-service system, a financial processing server, a credit bureau server, or the like).

In some embodiments, based on the likelihood, the processor may request manual verification of the new transaction. For example, if the likelihood is above a first threshold but below a second threshold, the processor may send one or more messages to one or more parties associated with the new transaction (e.g., a financial institution, an individual, a merchant, or the like) with a request to send confirmation of the new transaction. In such an example, the processor may send a message to a mobile phone and/or email address of the individual to request that the new transaction be verified (e.g., by sending a "Y," "yes," or other affirmative response). Additionally or alternatively, the processor may send a message to a merchant warning that a suspicious transaction has been processed and that the merchant will be denied future transactions if the number of suspicious transactions in a period of time exceeds a threshold.

Turning now to FIG. 1, there is shown an example of a wavelet. For example, the wavelet is an oscillation with an amplitude rising from zero to a maximum and returning to zero over a finite period of time. As explained above, systems of the present disclosure may encode transactions as wavelets. For example, a transaction may be visualized as a wavelet in which currency and/or commodity is temporarily disturbed by transfer between parties. The wavelet representing the transaction may be indexed by location, time, category of transaction (e.g., furniture, contractor services, grocery, or the like), and/or other indicators.

Figure 2A:
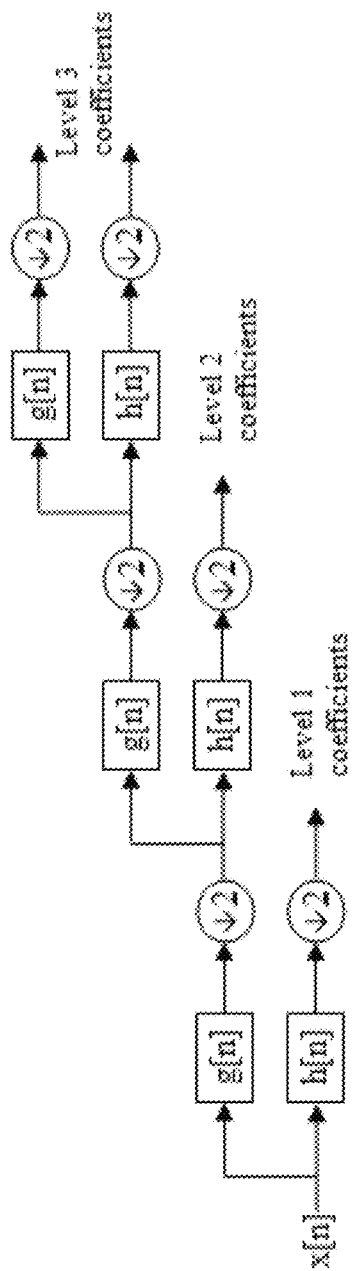
FIG. 2A is a block diagram of a filter bank, according to an exemplary embodiment of the present disclosure.
Figure 2B:
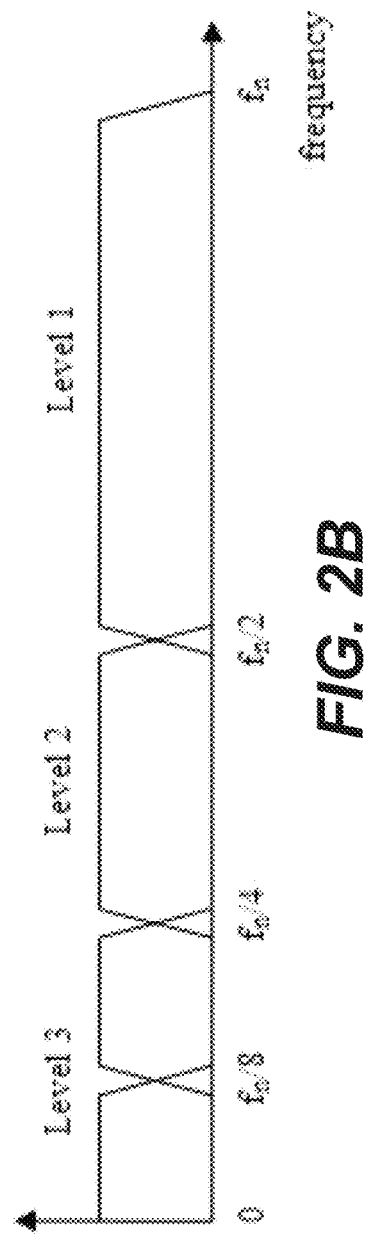
FIG. 2B is a graphical representation of the exemplary filter bank of FIG. 2A.

FIG. 2A depicts an exemplary filter bank used to perform a discrete wavelet transform. For example, as depicted in FIG. 2A, the cascading filters may decompose a signal into low and high frequencies at each level and may produce corresponding coefficients. The decomposition (and corresponding coefficients) may be output from a convolution at each level that samples particular frequencies. A graphical depiction of frequency range for each level of the filters of FIG. 2A is depicted in FIG. 2B.

Figure 3:
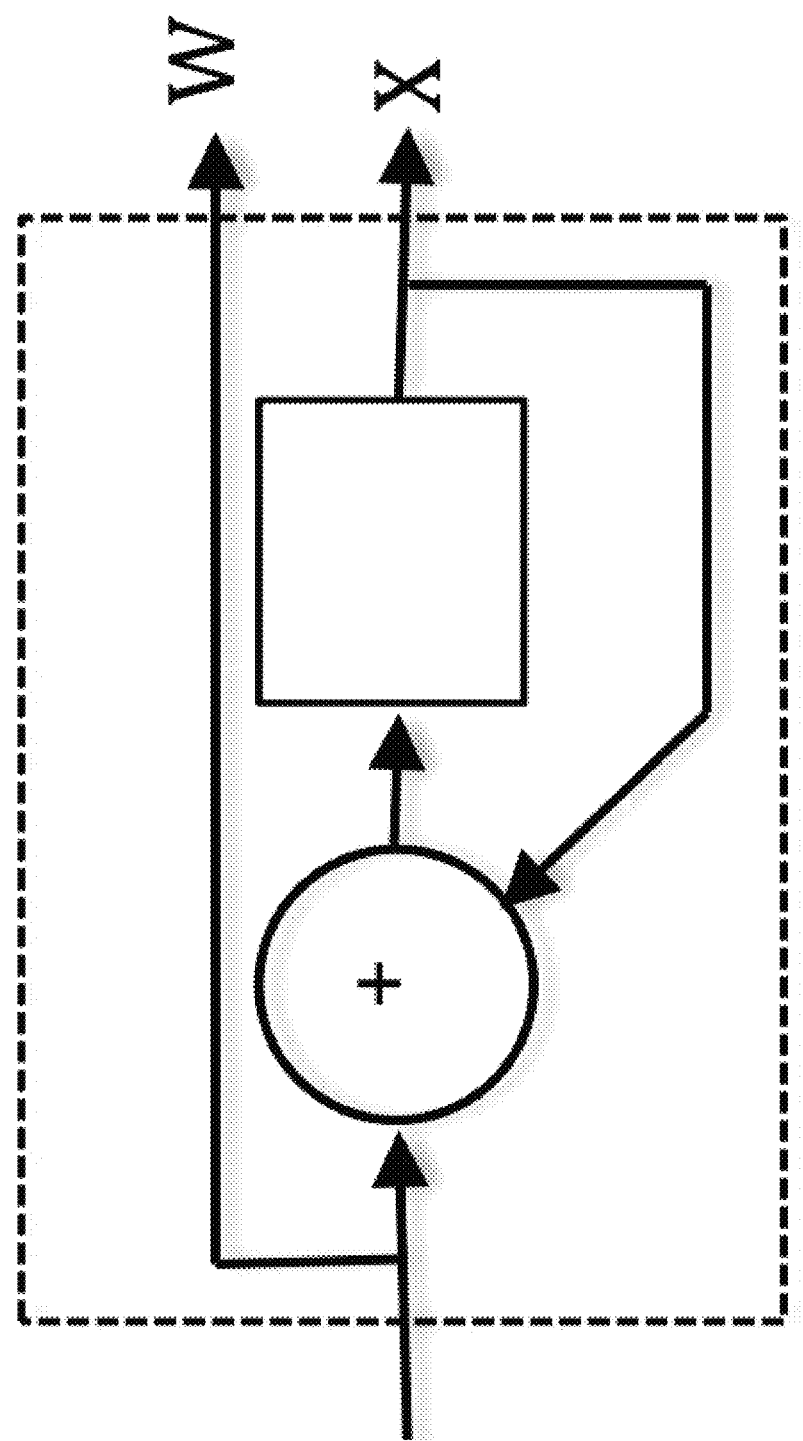
FIG. 3 is a diagram of a convolutional-accumulator, according to an exemplary embodiment of the present disclosure.

FIG. 3 depicts an exemplary convolutional-accumulator. The example of FIG. 3 is systematic because is includes the input data in output W as well as outputting convolution X. Although not depicted, non-systematic convolutional-accumulators may be used in combination with or in lieu of systematic convolutional-accumulators. Furthermore, the example of FIG. 3 is recursive because the convolutional output may be fed back into the convolutional-accumulator for use in other convolutions. Although not depicted, non-recursive convolutional-accumulators may be used in combination with or in lieu of recursive convolutional-accumulators.

Systems of the present disclosure may use cascading convolution-accumulators, similar to the examples depicted in FIGS. 2 and 3, to perform discrete wavelet transforms and obtain a tensor from the accumulation. In some embodiments, the accumulation function may be an exponential smoothing average to incorporate the natural base e into the tensor.

Figure 4:
FIG. 4 is a graphical representation of exponential smoothing coefficients, according to an exemplary embodiment of the present disclosure.

FIG. 4 depicts exemplary coefficients (depicted as columns in FIG. 4) used to perform exponential smoothing. As depicted in FIG. 4, the coefficients may exponentially decrease as the number of observations included in the smoothing linearly increases. Accordingly, as explained above, the natural base e is incorporated into the resulting smoothed tensor, which increases the ease of detecting anomalous tensors in financial markets.

Figure 5:
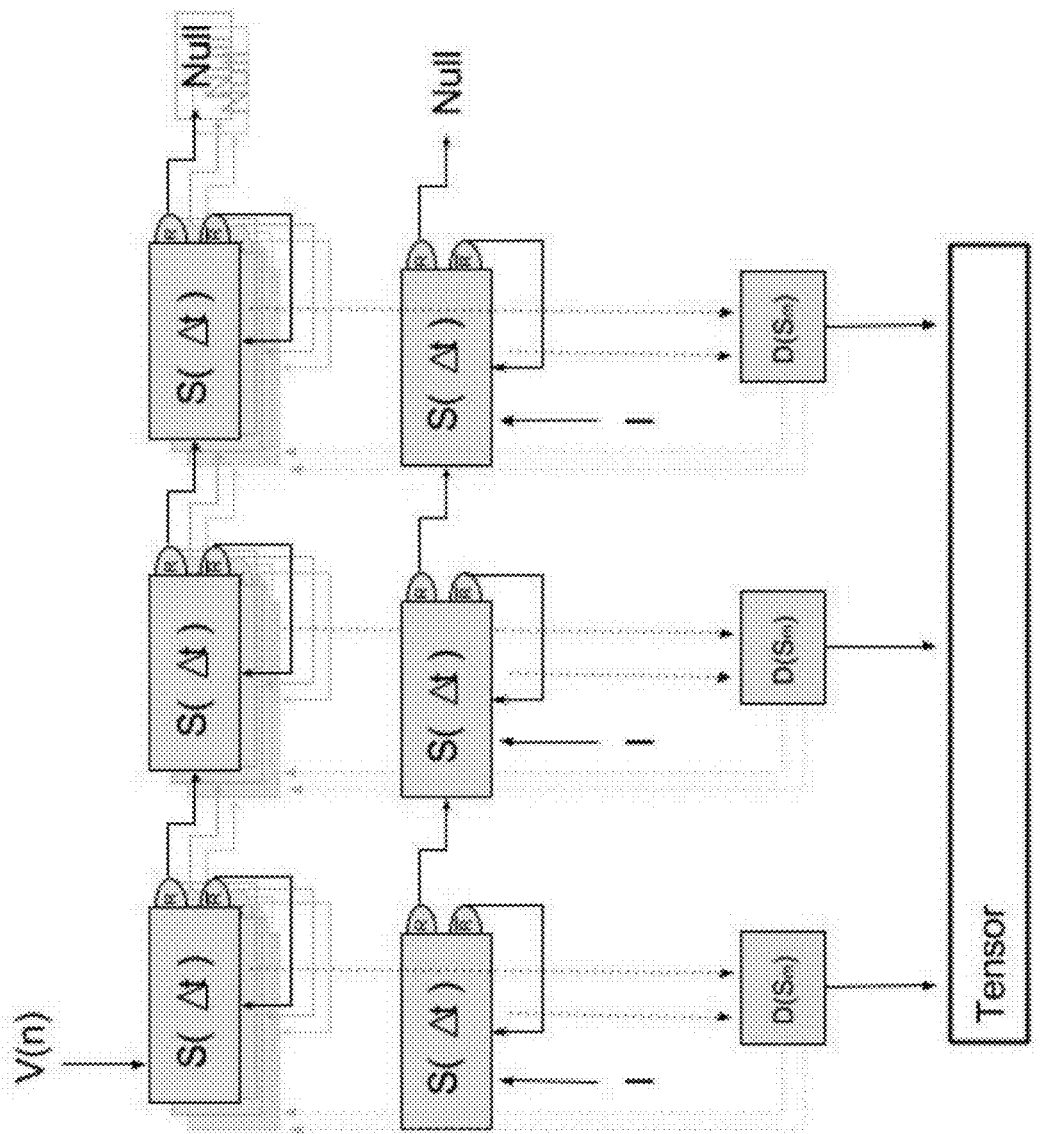
FIG. 5 is a block diagram of tensor extrapolation from wavelets, according to an exemplary embodiment of the present disclosure.

FIG. 5 depicts an exemplary transformation from discrete wavelets (S(Δt) as depicted in FIG. 5) to tensors. In particular, the discrete wavelets may undergo convolution (e.g., recursively as depicted in FIG. 5) followed by one or more accumulating (and smoothing) operations ($D(S_m)$ as depicted in FIG. 5). For example, $D(S_m)$ may represent any moving average, such as a simple moving average, a cumulative moving average, a weighted moving average, or the like. In some embodiments, $D(S_m)$ may represent an exponential smoothing average, as explained above with reference to FIG. 4.

Figure 6:
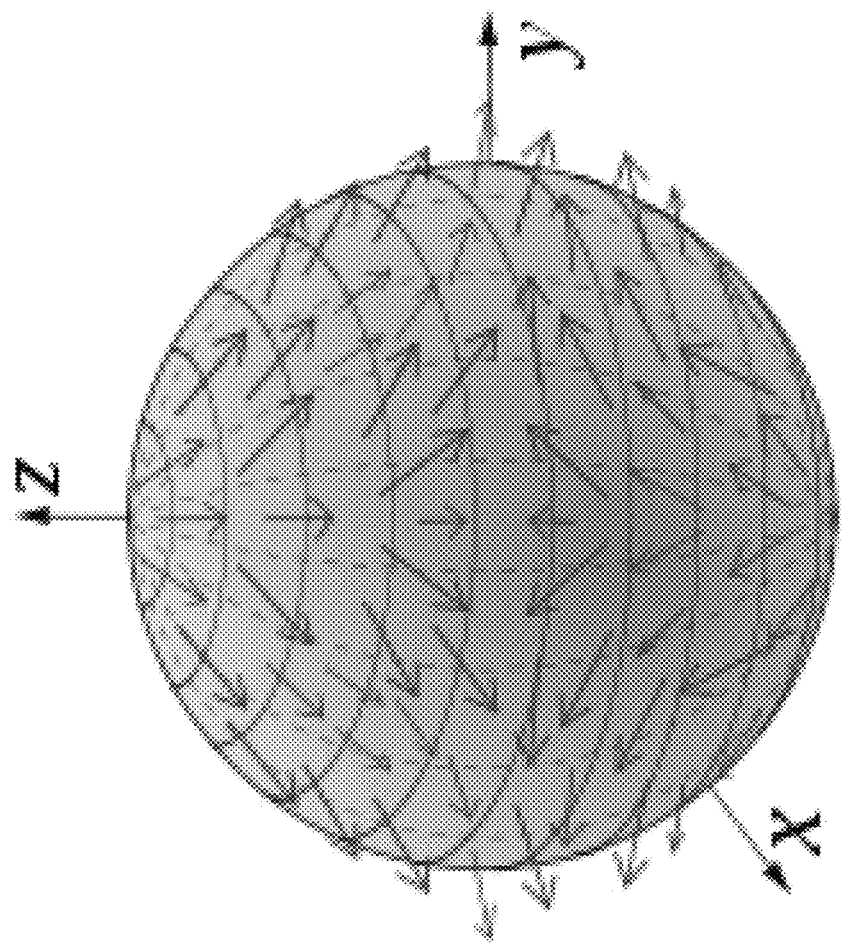
FIG. 6 is a graphical representation of a manifold, according to an exemplary embodiment of the present disclosure.

FIG. 6 depicts an exemplary manifold onto which a plurality of tensors are mapped. For example, similarly to the example of FIG. 6, systems of the present disclosure may map a set of tensors to a differentiable manifold, which is a topological manifold having a differentiable structure. Additionally, similar to the example of FIG. 6, systems of the present disclosure may use a smooth manifold, which is a differentiable manifold having derivatives of all orders that exist across the entire manifold. Additionally, similar to the example of FIG. 6, systems of the present disclosure may use an analytic manifold, which is a smooth manifold whose Taylor series is absolutely convergent. Additionally or alternatively, although not shown in FIG. 6, systems of the present disclosure may use a complex manifold, which is a manifold in complex space that is holomorphic.

Figure 7:
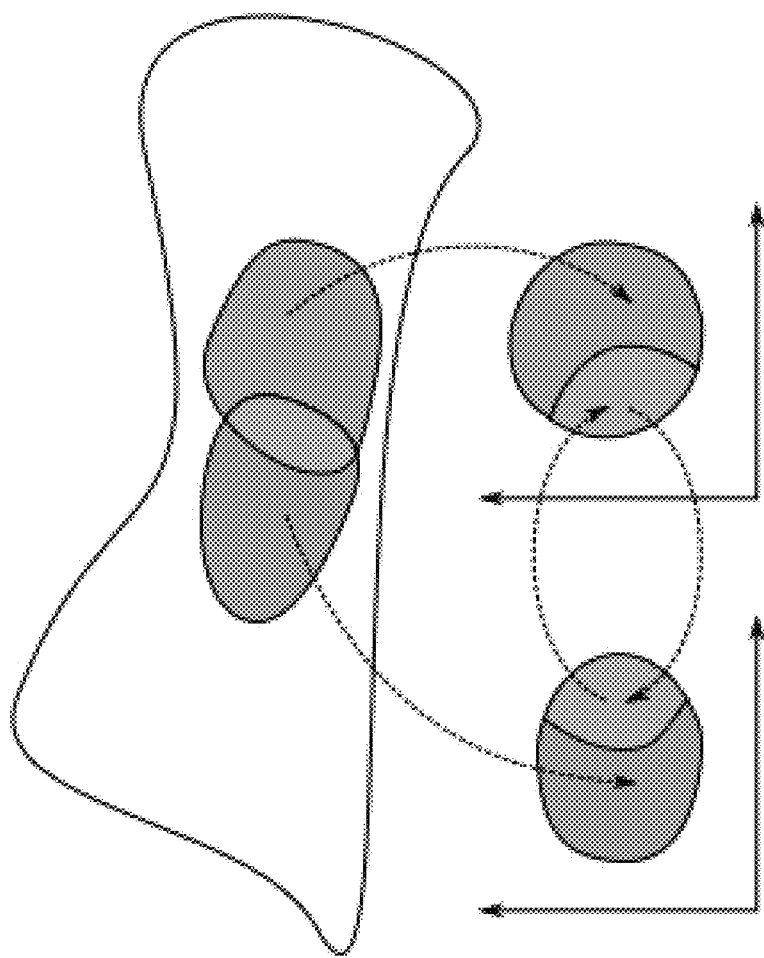
FIG. 7 is a graphical representation of an atlas mapping a manifold to a linear space, according to an exemplary embodiment of the present disclosure.

FIG. 7 depicts an exemplary atlas mapping a subset of points to points on a manifold (such as that depicted in FIG. 6) by an index set. By selecting an appropriate atlas to perform a mapping, various constraints on the resulting manifold may be obtained. For example, by selecting an appropriate atlas, systems of the present disclosure may ensure the mapping of tensors onto a differentiable manifold (or a smooth manifold, an analytic manifold, a complex manifold, or the like).

Figure 8:
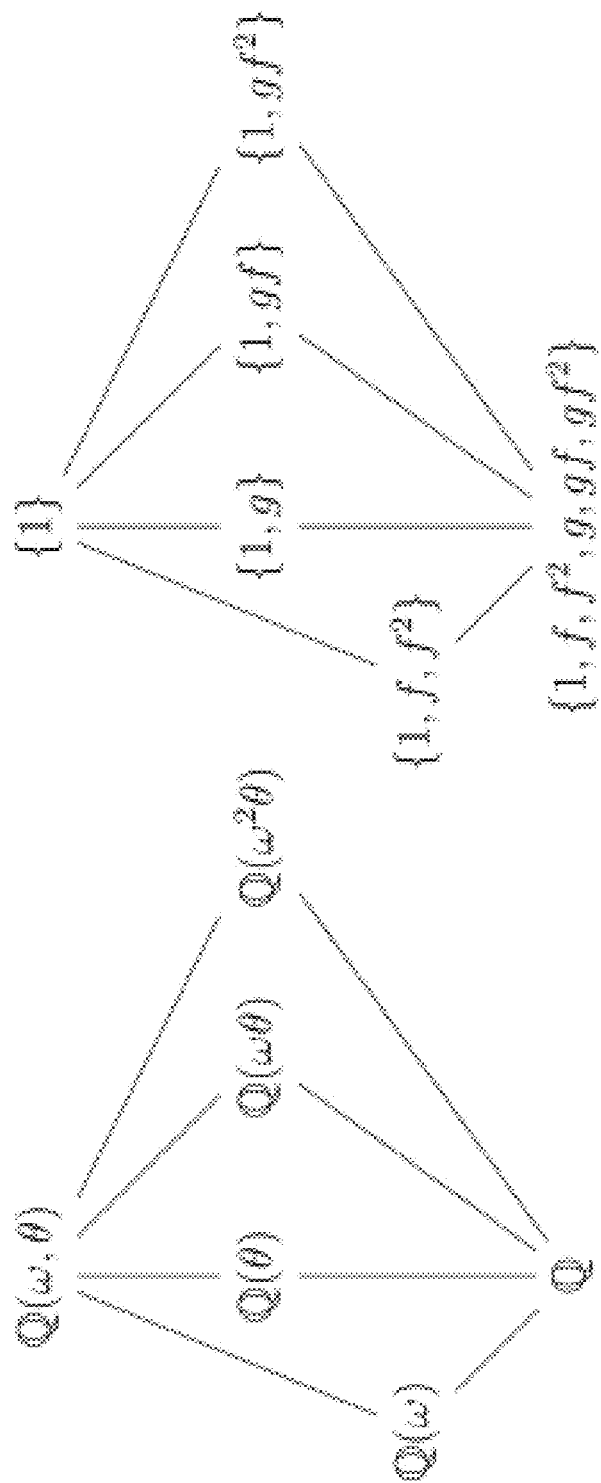
FIG. 8 is a diagram of a Galois connection, according to an exemplary embodiment of the present disclosure.

FIG. 8 depicts an example Galois connection between a base field $\mathbb{Q}$ and a group $G=\{f,f^2,g,gf,gf^2\}$. As depicted in FIG. 8, three subgroups of G and three subfields of $\mathbb{Q}$ are isomorphic. Systems of the present disclosure may use a Galois connection between a field and a tensor (or group) to calculate difference vectors while ensuring isomorphism between the field and the tensor.

Figure 9:
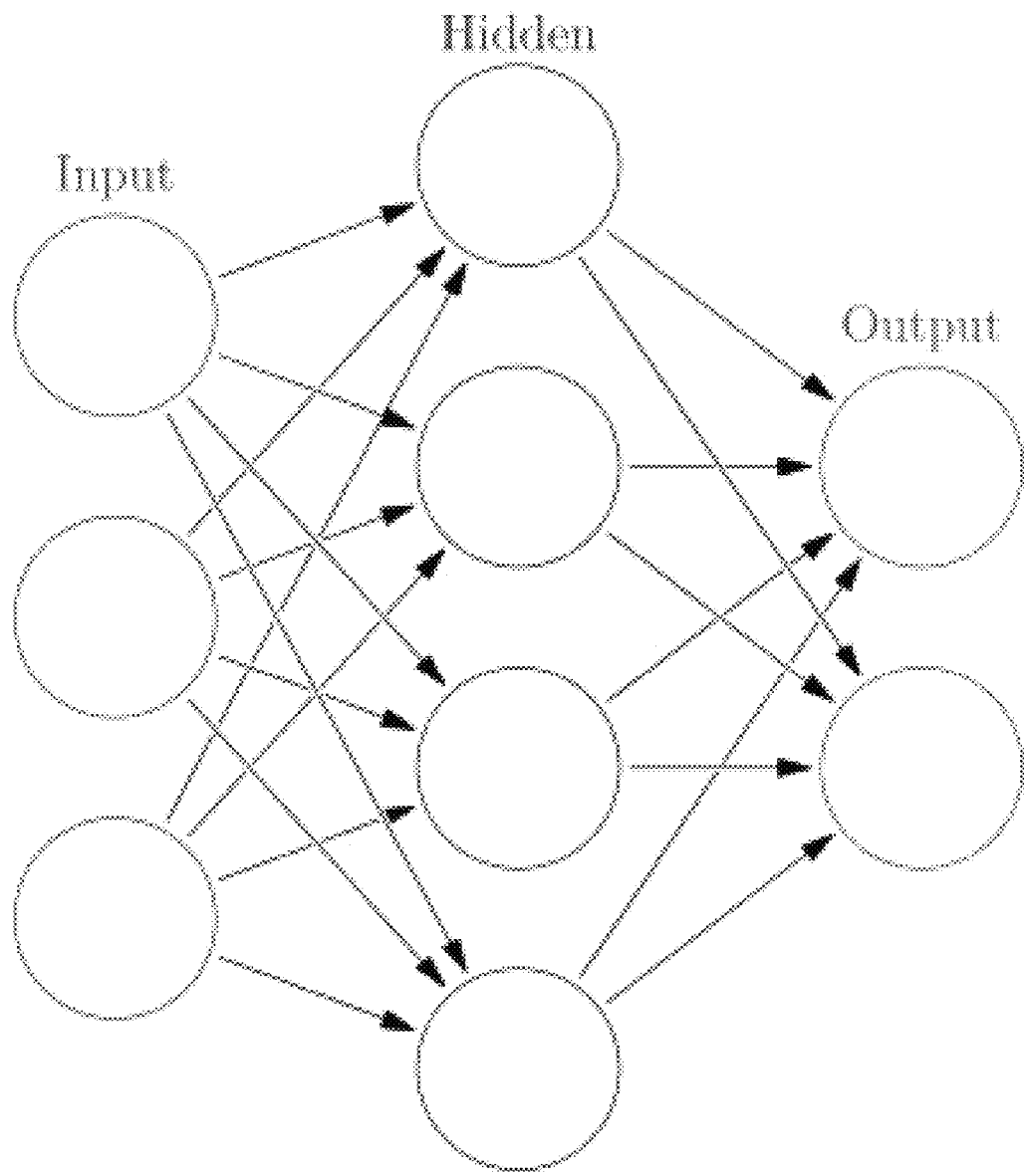
FIG. 9 is a diagram of an exemplary artificial neural network.

FIG. 9 depicts an exemplary artificial neural network as used in extant systems. In neural networks like the example depicted in FIG. 9, one or more inputs (e.g., real numbers) are processed by nodes (or neurons) in a hidden layer in order to produce outputs. Although not depicted in FIG. 9, the hidden layer may comprise a plurality of layers such that some nodes pass their output(s) to an additional hidden layer rather than directing outputting. Each node (or neuron) typically has a weighting function (often non-linear), and its weights are modified during a learning procedure to reduce a loss function (and therefore increase accuracy).

Unlike the Galois connection networks used by systems of the present disclosure, however, neural networks like that depicted in FIG. 9 frequently fail to recognize particular patterns. In addition, there may be significant numbers of false positives (and, correspondingly, false negatives) in the use of neural networks. Galois connection networks developed according to the present disclosure generally produce higher accuracy and, corresponding, lower false positives and false negatives than traditional neural networks.

Figure 10A:
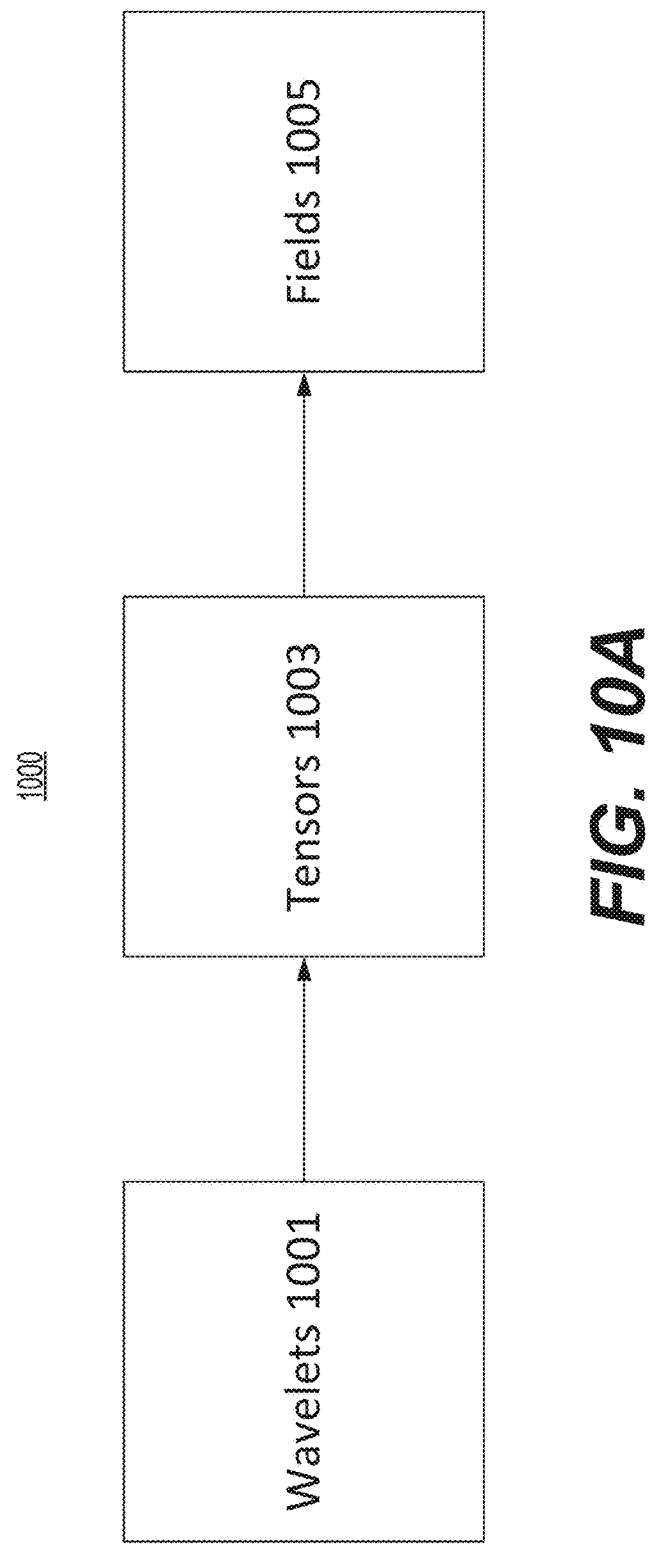
FIG. 10A is a block diagram of an exemplary system for detecting anomalies within a database comprising discrete wavelets, according to an exemplary embodiment of the present disclosure.

FIG. 10A depicts an exemplary system 1000 for detecting anomalies within a database comprising discrete wavelets. System 1000 may be implemented on one or more servers, such as detection server 1501 of FIG. 15. The one or more servers may be housed on one or more server farms.

As depicted in FIG. 10A, system 1000 may use wavelets 1001 as input. For example, as explained above, wavelets 1001 may be received by system 1000 (e.g., from one or more memories and/or over one or more computer networks) and/or determined by system 1000 based on data (e.g., one or more transactions) received by system 1000.

As further depicted in FIG. 10A, system 1000 may convert wavelets 1001 to tensors 1003. For example, as explained above, system 1000 may perform a discrete wavelet transform (that is, a cascading convolution) with a smoothing accumulator to transform the wavelets 1001 to tensors 1003. In some embodiments, a simple moving average, a cumulative moving average, a weighted moving average, or the like, may be used for smoothing. In certain aspects, the smoothing may be an exponential smoothing average. By using an exponential smoothing average, the natural base e may be incorporated into the smoothing.

As further depicted in FIG. 10A, system 1000 may convert tensors 1003 to a field 1005. For example, as explained above, system 1000 may use one or more atlases to map tensors 1003 onto a manifold to form field 1005. In some embodiments, system 1000 may select the one or more atlases to ensure particular properties of the resulting manifold (e.g., to result in a differential manifold, a smooth manifold, an analytic manifold, a complex manifold, or the like).

Field 1005 may be used by system 1000 to detect anomalous wavelets, as explained above. For example, system 1000 may calculate a difference field between a new wavelet and field 1005 and may sum the difference field to form a difference vector. Accordingly, the magnitude and/or direction of the difference vector may be used to determine an anomaly likelihood (e.g., using one or more models, as explained above).

Figure 10B:
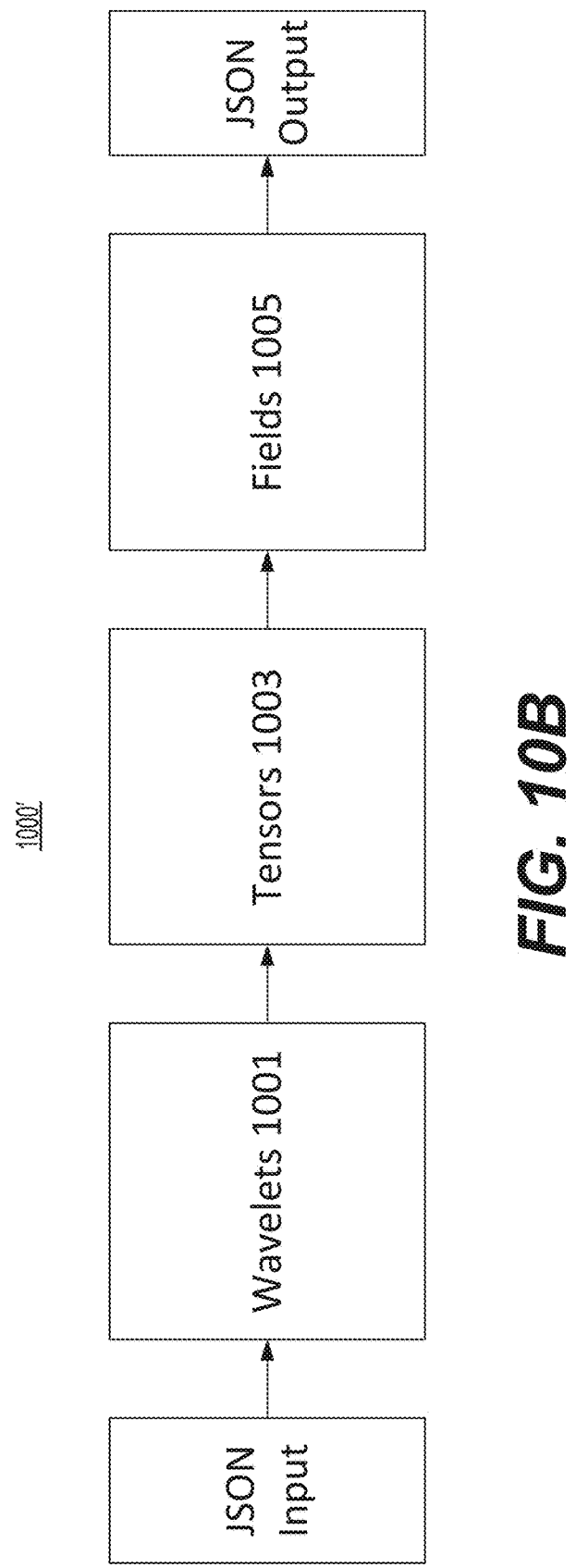
FIG. 10B is a block diagram of another exemplary system for detecting anomalies within a database comprising discrete wavelets, according to an exemplary embodiment of the present disclosure.
Figure 10C:
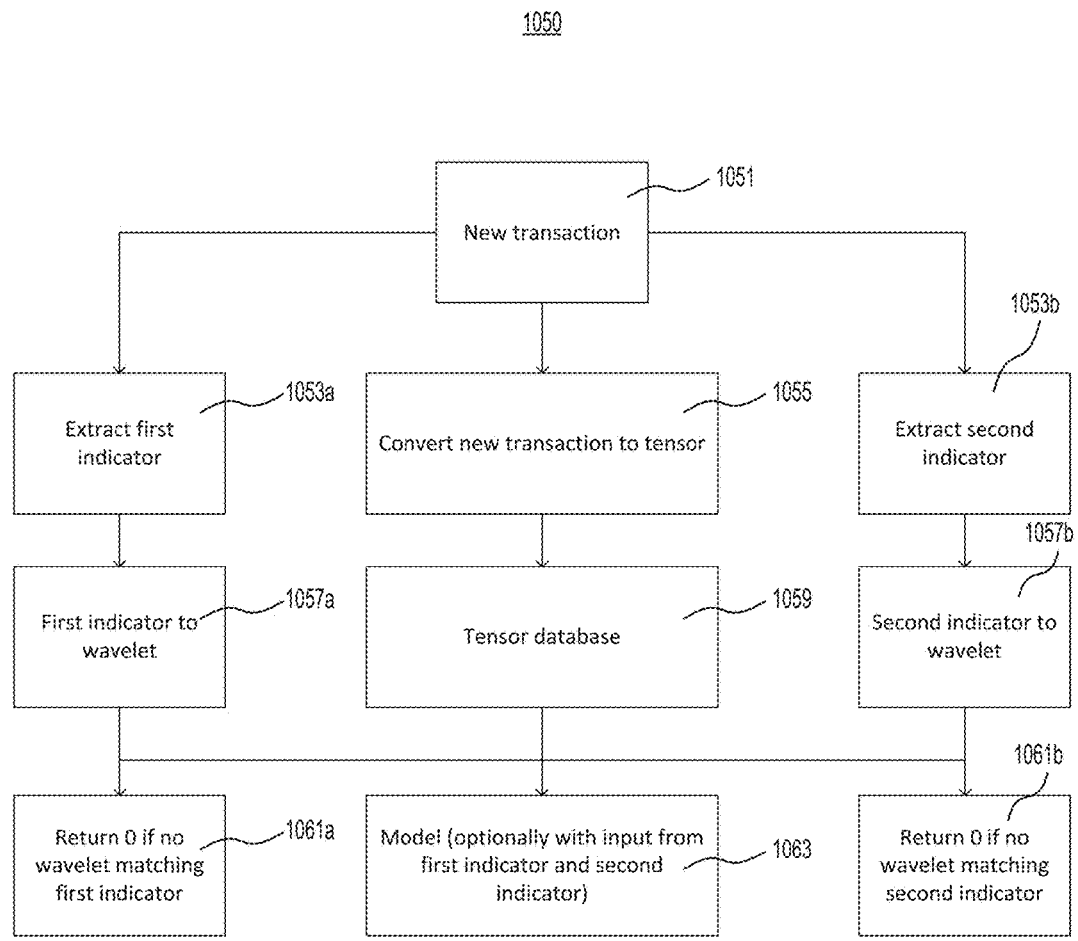
FIG. 10C is a block diagram of an exemplary workflow for detecting high risk transactions using a database comprising discrete wavelets, according to an exemplary embodiment of the present disclosure.

FIG. 10B depicts another exemplary system 1000' for detecting anomalies within a database comprising discrete wavelets. System 1000' may be implemented on one or more servers, such as detection server 1501 of FIG. 15. The one or more servers may be housed on one or more server farms.

Similar to system 1000 of FIG. 10A, system 1000' receives wavelets 1001, converts wavelets 1001 to tensors 1003, and maps tensors 1003 to field 1005. In addition, as depicted in FIG. 10B, system 1000' determines wavelets 1001 based on received input comprising JavaScript Object Notation (JSON) data. Additional or alternative data serialization formats, such as Extensible Markup Language (XML), YAML Ain't Markup Language (YAML), or the like. Data serialization formats allow for rapid and lightweight transmission of data (e.g., transactions) to system 1000'. In addition, data serialization formats may allow for direct use of the received data (e.g., for conversion to wavelets or even for direct processing by a discrete wavelet transform) without having to reconstruct a data structure or object therefrom. Furthermore, many extant database structures (such as MongoDB, Oracle NoSQL Database, or the like) support native exportation directly to a data serialization format such as JSON. Accordingly, accepting data serialization formats may allow for faster and more native integration with existing transaction databases.

FIG. 100 depicts an exemplary workflow 1050 of detecting a high risk transaction using a database comprising discrete wavelets. For example, workflow 1050 may represent one exemplary usage of system 1000 of FIG. 10A and/or system 1000' of FIG. 10B.

At step 1051, system 1000 receives a new transaction. For example, as explained above, system 1000 may receive a wavelet representing a transaction, may receive a data serialization format for use as though it were a wavelet, and/or raw data for conversion to a wavelet and/or a data serialization format.

At steps 1053a and 1053b, system 1000 may extract a first indicator and a second indicator from the new transaction. For example, the first indicator may comprise an identifier of a financial account, an identifier of a merchant, a location of the new transaction, a time of the new transaction, an Internet Protocol (IP) address or other identifier of a payment device (e.g., a mobile phone) and/or of a point-of-service system (e.g., a register), or the like. Similarly, the second indicator may comprise an identifier of a financial account, an identifier of a merchant, a location of the new transaction, a time of the new transaction, an IP address or other identifier of a payment device (e.g., a mobile phone) and/or of a point-of-service system (e.g., a register), or the like.

In addition, at step 1055, system 1000 may convert the new transaction to a tensor, as explained above. For example, system 1000 may perform a discrete wavelet transform (that is, a cascading convolution) with a smoothing accumulator to transform the new transaction to a tensor. In some embodiments, a simple moving average, a cumulative moving average, a weighted moving average, or the like, may be used for smoothing. In certain aspects, the smoothing may be an exponential smoothing average. By using an exponential smoothing average, the natural base e may be incorporated into the smoothing.

At steps 1057a and 1057b, system 1000 may use the first indicator and the second indicator to generate wavelets from the new transaction indexed by and/or incorporating the properties of the first indicator and the second indicator. In some embodiments, these wavelets may be further converted to tensors, as explained above.

In addition, at step 1059, system 1000 may determine a difference between the new transaction tensor and an existing tensor database (e.g., a tensor field representing previous transaction tensors mapped to a manifold). For example, as explained above, system 1000 may determine a difference field between the new transaction tensor and the existing tensor database and sum the difference field into a difference vector.

At steps 1061a and 1061b, system 1000 may use the wavelets indexed by and/or incorporated into the first indicator and the second indicator to find matching wavelets in the existing tensor database. For example, system 1000 may determine whether the matching wavelets are in an expected location in the database (e.g., in the field) in order to assist with authorizing the new transaction.

In addition, at step 1063, system 1000 may apply a model (or a plurality of models) to the difference between the new transaction tensor and an existing tensor database. For example, as explained above, system 1000 may apply the model to determine a likelihood of the new transaction being anomalous (and/or high risk). In some embodiments, as depicted in FIG. 100, system 1000 may include the first indicator and the second indicator as inputs to the model. For example, the first indicator and/or the second indicator may server to select the model (or plurality of models) to apply. In such an example, the selection of the model (or plurality of models) may depend on a particular financial account, a particular merchant, a particular location of the new transaction, a particular time of the new transaction, a particular IP address of a payment device (e.g., a mobile phone) and/or of a point-of-service system (e.g., a register), or any combination thereof.

By using workflow 1050, systems of the present disclosure may incorporate traditional rule-based authentication techniques (e.g., using the first indicator and the second indicator) with the deep field networks disclosed herein. Accordingly, systems of the present disclosure may be used to combine extant transactions authorizations with novel determinations of fraudulency likelihood.

Although FIG. 100 depicts using a first indicator and a second indicator, workflow 1050 of FIG. 100 may incorporate any number of indicators, such as one, two, three, four, five, or the like. In alternative embodiments not depicted, workflow 1050 of FIG. 100 may use the model (or plurality of models) without any additional indicators.

Figure 10D:
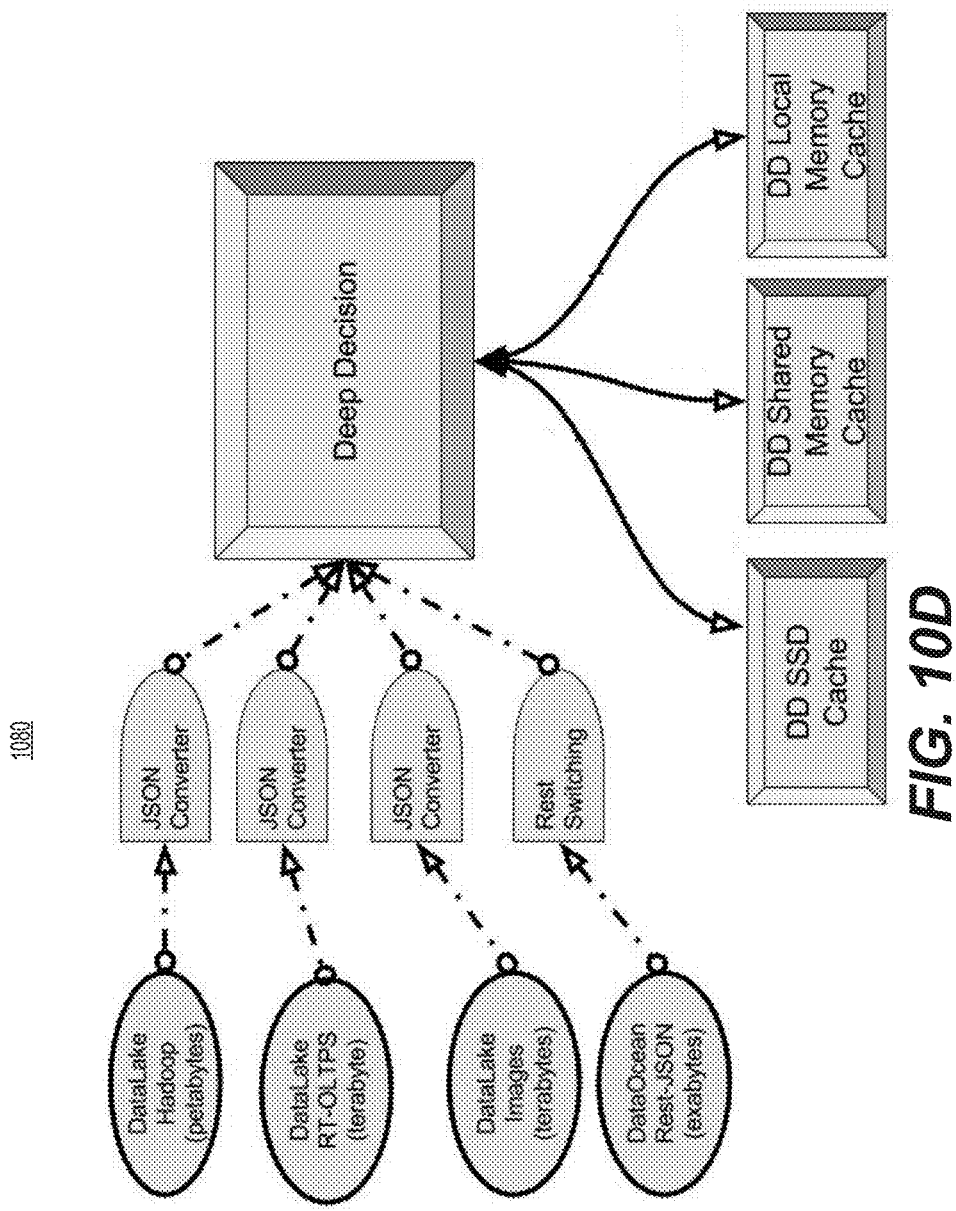
FIG. 10D is a block diagram of an exemplary workflow for constructing and using a database comprising discrete wavelets, according to an exemplary embodiment of the present disclosure.

FIG. 10D depicts an exemplary workflow 1080 of constructing and using a database comprising discrete wavelets. For example, workflow 1080 may represent an additional or alternative example usage of system 1000 of FIG. 10A and/or system 1000' of FIG. 10B.

As depicted in FIG. 10D, one or more sources of transactions for systems of the present disclosure may include one or more data lakes comprising a distributed file system (such as Apache Hadoop or the like), one or more data lakes comprising images (such as Microsoft Azure Data Lake or the like), one or more real-time online transaction processing systems (RT-OLTPS) (such as PayPal or the like), one or more data oceans (such as JSON objects exchanged using a Representational State Transfer (REST) protocol, XML objects exchanged using a Simple Object Access Protocol (SOAP), or the like). Accordingly, system 1000 may receive historical transactions, transactions awaiting authorization, or a combination thereof. Although depicted as using JSON objects, other data serialization formats such as XML, YAML, or the like, may be used in lieu of or in combination with JSON objects.

As further depicted in FIG. 10D, Deep Decision may represent a system according to the present disclosure (e.g., system 1000 of FIG. 10A and/or system 1000' of FIG. 10B). Accordingly, Deep Decision may use received transactions for training one or more models (e.g., according to method 1300 of FIG. 13, described below), for developing a tensor field representing historical transactions (e.g., as described above), and/or for authorizing new, incoming transactions (e.g., according to method 1400 of FIG. 14, described below). Outputs from Deep Decision, which may include, for example, one or more trained models, one or more fields, and/or one or more authorizations, may be stored in one or more caches, as depicted in FIG. 10D. Additionally or alternatively, outputs may be send to other systems, such as a personal computer such as a desktop computer or mobile phone, a point-of-service system, a financial processing server, a credit bureau server, or the like.

Figure 11:
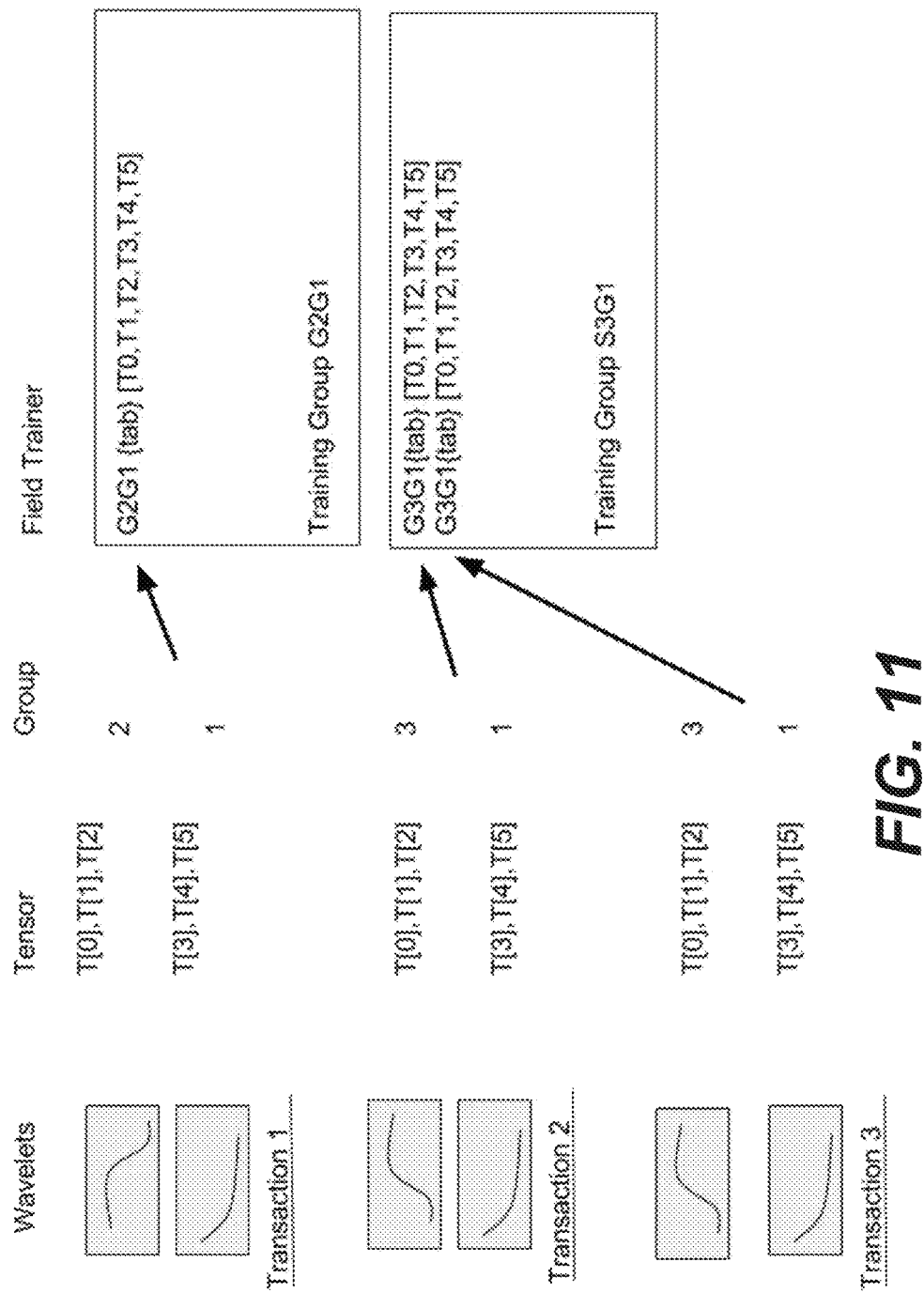
FIG. 11 is a diagram of an example of training a deep field network to detect anomalies within a database comprising discrete wavelets, according to an exemplary embodiment of the present disclosure.

FIG. 11 depicts an example of training a deep field network to detect anomalies within a database comprising discrete wavelets. Example 1100 may represent a training sequence implemented on, for example, system 1000 of FIG. 10A and/or system 1000' of FIG. 10B.

As depicted in FIG. 11, transactions may be represented as one or more wavelets. Although depicted as two wavelets in FIG. 11, a transaction may be represented with any number of wavelets (e.g., one, two, three, four, five, or the like). Additionally, although depicted as each having two wavelets in FIG. 11, different transactions may be represented by different numbers of wavelets. For example, a first transaction may be represented by a single wavelet, and a second transaction may be represented by three wavelets.

Furthermore, as depicted in FIG. 11, the wavelets may be converted to tensors that have coefficients along selected bases. Although the example of FIG. 11 includes three bases, any number of bases (e.g., one, two, three, four, five, or the like) may be used. In addition, the wavelets may be converted to a plurality of tensors, each having different coefficients along different bases.

As further depicted in FIG. 11, the tensors may be grouped based on corresponding coefficients. In the example of FIG. 11, the tensors representing the first transaction are placed in a first group while the tensors representing the second transaction are placed in a second group. Although depicted as grouped together in FIG. 11, tensors representing the same transaction may be placed in different groups based on having different coefficients (e.g., by having different bases). The groups depicted in FIG. 11 may be used to perform training of one or more models for each group (e.g., as discussed with respect to method 1300 of FIG. 13).

Figure 12:
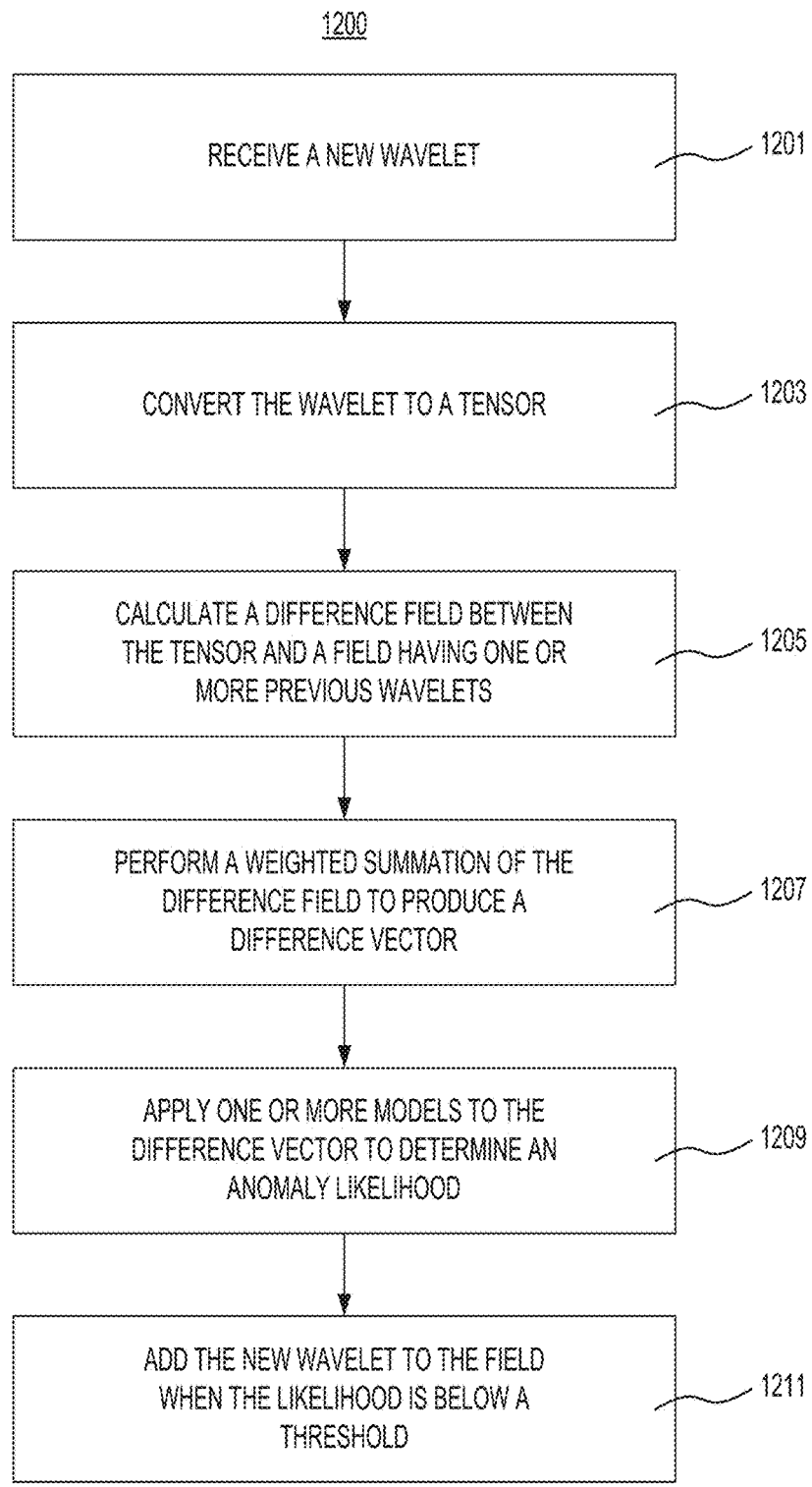
FIG. 12 is a flowchart of an exemplary method for detecting anomalies within a database comprising discrete wavelets, according to an exemplary embodiment of the present disclosure.

FIG. 12 is a flowchart of exemplary method 1200 for detecting anomalies within a database comprising discrete wavelets. Method 1200 may be implemented using a general-purpose computer including at least one processor, e.g., detection server 1501 of FIG. 15. Alternatively, a special-purpose computer may be built for implementing method 1200 using suitable logic elements.

At step 1201, a processor may receive a new wavelet. Although the processor may receive the wavelet in the form of a wavelet, the wavelet need not be received in the form of an oscillation but may be represented in any appropriate form (e.g., an array, a digital signal, or the like). The wavelet may be received from one or more memories and/or across one or more computer networks.

Alternatively, the processor may receive data and convert the data into a wavelet. For example, the processor may receive a transaction having associated properties (such as time, location, merchant, amount, etc.) and may convert the transaction into a wavelet or into an array or other format that represents a wavelet. The data may be received in and/or converted to one or more data serialization formats, such as JSON, XML, YAML, etc.

At step 1203, the processor may convert the wavelet to a tensor. For example, as explained above, the processor may convert the wavelet to a tensor based using a moving average, such as a simple moving average, a cumulative moving average, a weighted moving average, an exponential moving average, or the like. Accordingly, the processor may perform a cascading convolution (e.g., with one or more filter banks) followed by an accumulation (e.g., using the moving average for smoothing) to transform the received wavelet into a tensor.

At step 1205, the processor may calculate a difference field between the tensor and a field having one or more previous wavelets represented as tensors. For example, the processor may have previously calculated the field using wavelets received in the past. Similarly to step 1203, the processor may perform cascading convolution (e.g., with one or more filter banks) followed by an accumulation (e.g., using the moving average for smoothing) to transform the previous wavelets into tensors and obtain the field by mapping the tensors onto a manifold (e.g., a differential manifold or the like) using one or more atlases.

Alternatively, the processor may receive the tensors representing the previous wavelets (e.g., from one or more memories and/or over one or more computer networks) and construct the field therefrom. Alternatively, the processor may receive the field directly (e.g., from one or more memories and/or over one or more computer networks).

At step 1207, the processor may perform a weighted summation of the difference field to produce a difference vector. For example, the coefficient weights may be derived from training of one or more particular models. The one or more models may be trained for particular identifiers (e.g., particular accounts, particular persons, particular merchants, particular institutions, etc.), particular times (e.g., time of day, time of year, etc.), particular locations (e.g., particular country, particular city, particular postal code, etc.), or the like. Additionally or alternatively, as explained above, the summation may include a notch filter.

At step 1209, the processor may apply one or more models to the difference vector to determine a likelihood of the new wavelet representing an anomaly. As explained above, the likelihood may be output from one or more particular models. The one or more models may be trained for particular identifiers (e.g., particular accounts, particular persons, particular merchants, particular institutions, etc.), particular times (e.g., time of day, time of year, etc.), particular locations (e.g., particular country, particular city, particular postal code, etc.), or the like.

At step 1211, the processor may add the new wavelet to the field when the likelihood is below (or equal to) a threshold. Accordingly, the processor may accept the new wavelet as a valid historical datapoint to be used in future anomaly detection.

Method 1200 may include additional steps. For example, method 1200 may include sending a rejection signal or a message indicating the likelihood and/or a reason (e.g., based on the one or more models) for rejection when the likelihood is above (or equal to) the threshold. The processor may send the notification to one or more parties associated with the new wavelet (e.g., a financial institution, an individual, a merchant, or the like) and/or to one or more computer systems from which the new wavelet was received (e.g., a personal computer such as a desktop computer or mobile phone, a point-of-service system, a financial processing server, a credit bureau server, or the like). Similarly, method 1200 may include sending an acceptance signal or a message indicating the likelihood and/or a reason (e.g., based on the one or more models) for acceptance when the likelihood is below (or equal to) the threshold. The notification may be sent similarly to the rejection signal or message.

Figure 13:
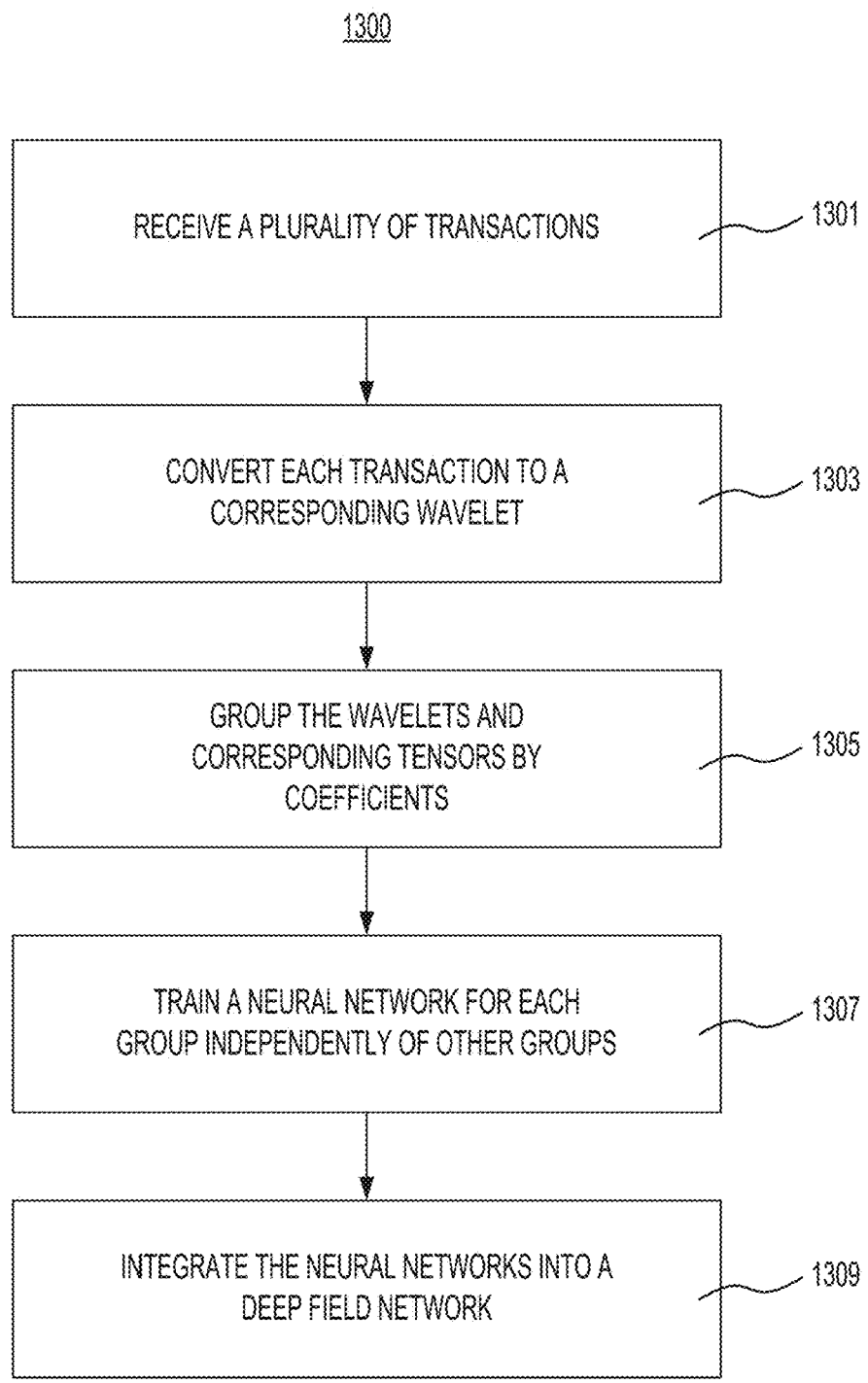
FIG. 13 is a flowchart of an exemplary method for training a deep field network to detect anomalies within a database comprising discrete wavelets, according to an exemplary embodiment of the present disclosure.

FIG. 13 is a flowchart of exemplary method 1300 for training a deep field network to detect anomalies within a database comprising discrete wavelets. Method 1300 may be implemented using a general-purpose computer including at least one processor, e.g., detection server 1501 of FIG. 15. Alternatively, a special-purpose computer may be built for implementing method 1300 using suitable logic elements.

At step 1301, a processor may receive a plurality of transactions. The transactions need not be received in any particular format but may be represented in any appropriate form such as arrays, digital signals, or the like. The transactions may be received from one or more memories and/or across one or more computer networks. Alternatively, the processor may receive raw data and convert the data into a format representing a transaction. For example, the processor may receive a data with time, location, party identifiers, amount, and the like and may convert this data into a single bundle representing a transaction.

At step 1303, the processor may convert each transaction to a corresponding wavelet. For example, as explained above, the processor may receive a transaction having associated properties (such as time, location, merchant, amount, etc.) and may convert the transaction (along with its associated properties) into a wavelet or into an array or other format that represents a wavelet. Additionally or alternatively, the processor may convert raw data representing a transaction to one or more data serialization formats, such as JSON, XML, YAML, etc., that may be operated on as though it were a wavelet.

At step 1305, the processor may group the plurality of wavelets and corresponding tensors by coefficients included in the wavelets. For example, as explained above, the corresponding tensors may be determined using one or more convolutional-accumulators. Because each tensor includes coefficients for each base in the set of bases representing a corresponding multi-dimensional space in which the tensor may be represented, the processor may group the tensors (and therefore, the corresponding wavelets) by these coefficients. In some embodiments, the processor may generate a plurality of groups of coefficients and, thus, a plurality of groupings of the tensors (with the corresponding wavelets). For example, the processor may select bases depending on which factors are most heavily weighted in one or more models being trained and then perform a plurality of groupings, each for a particular model (or set of models) having factors corresponding to the bases used to determine the corresponding grouping.

At step 1307, the processor may train a neural network for each group independently of other groups. Although "neural network" usually refers to a traditional artificial neural network as depicted, for example, in FIG. 9, the processor at step 1307 may train any model (e.g., the models discussed above with respect to the groupings) that produces a likelihood of a particular tensor being anomalistic within a group. As used herein, the term "train" refers to the adjustment of one or more parameters of the model (such as coefficients, weights, constants, or the like) to increase accuracy of the model (e.g., to match known properties of the tensors in the each group).

At step 1309, processor may integrate the neural networks into a deep field network. For example, the models may be combined into a larger predictive scheme. In one particular example, the models may be combined such that when a new tensor is convolved (or otherwise combined with the models), the model trained on the group (or groups) having the most similar coefficients will be amplified while other models (e.g., trained on groups with less similar coefficients) will be minimized.

Method 1300 may include additional steps. For example, the deep field network produced by step 1309 may be stored (or transmitted for remote storage) for use in future analysis. In addition, the processor may index the stored deep field network such as different models within the network may be extracted using one or more indices indicating the properties and/or coefficients on which the model was trained (and to which the model is sensitive).

Figure 14:
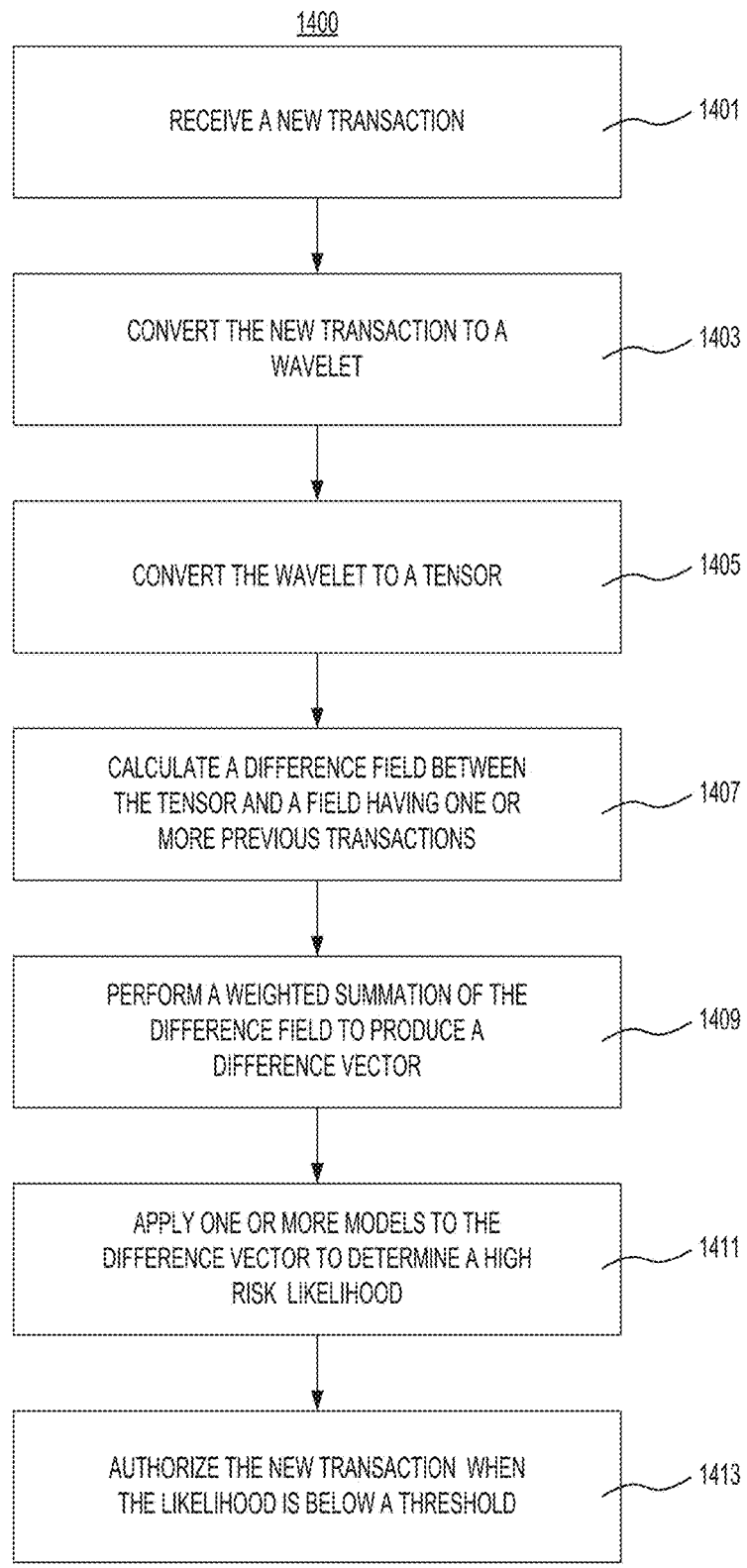
FIG. 14 is a flowchart of an exemplary method for authorizing a transaction using cascading discrete wavelets, according to an exemplary embodiment of the present disclosure.

FIG. 14 is a flowchart of exemplary method 1400 for authorizing a transaction using cascading discrete wavelets. Method 1400 may be implemented using a general-purpose computer including at least one processor, e.g., detection server 1501 of FIG. 15. Alternatively, a special-purpose computer may be built for implementing method 1400 using suitable logic elements.

At step 1401, a processor may receive a new transaction. The new transaction need not be received in any particular format but may be represented in any appropriate form such as arrays, digital signals, or the like. The new transaction may be received from one or more memories and/or across one or more computer networks. Alternatively, the processor may receive raw data and convert the data into a format representing a transaction. For example, the processor may receive a data with time, location, party identifiers, amount, and the like and may convert this data into a single bundle representing a transaction.

At step 1403, the processor may convert the new transaction to a wavelet. For example, as explained above, the processor may convert new the transaction (along with its associated properties) into a wavelet or into an array or other format that represents a wavelet. Additionally or alternatively, the processor may convert raw data representing the new transaction to one or more data serialization formats, such as JSON, XML, YAML, etc., that may be operated on as though it were a wavelet.

At step 1405, the processor may convert the wavelet to a tensor using an exponential smoothing average. For example, as explained above, the corresponding tensors may be determined using one or more convolutional-accumulators At step 1407, the processor may calculate a difference field between the tensor and a field having one or more previous transactions represented as tensors. For example, the processor may have previously calculated the field using transactions received in the past. Similarly to step 1405, the processor may perform cascading convolution (e.g., with one or more filter banks) followed by an accumulation (e.g., using the moving average for smoothing) to transform the previous transactions into tensors and obtain the field by mapping the tensors onto a manifold (e.g., a differential manifold or the like) using one or more atlases.

Alternatively, the processor may receive the tensors representing the previous transactions (e.g., from one or more memories and/or over one or more computer networks) and construct the field therefrom. Alternatively, the processor may receive the field directly (e.g., from one or more memories and/or over one or more computer networks).

At step 1409, the processor may perform a weighted summation of the difference field to produce a difference vector. For example, the coefficient weights may be derived from training of one or more particular models. The one or more models may be trained for particular identifiers of transactions (e.g., particular financial accounts, particular persons, particular merchants, particular financial institutions, etc.), particular transaction times (e.g., time of day, time of year, etc.), particular transaction locations (e.g., particular country, particular city, particular postal code, etc.), or the like. Additionally or alternatively, as explained above, the summation may include a notch filter.

At step 1411, the processor may apply one or more models to the difference vector to determine a likelihood of the transaction being high risk. As explained above, the likelihood may be output from one or more particular models. The one or more models may be trained for particular identifiers of transactions (e.g., particular financial accounts, particular persons, particular merchants, particular financial institutions, etc.), particular transaction times (e.g., time of day, time of year, etc.), particular transaction locations (e.g., particular country, particular city, particular postal code, etc.), or the like.

At step 1413, the processor may authorize the new transaction when the likelihood is below a threshold. Accordingly, the processor may accept the new wavelet as a valid historical datapoint to be used in future anomaly detection.

Additionally or alternatively, the processor may use the likelihood determined at step 1412 to perform other functions. For example, if the new transaction is enrollment of a new account (such as a brokerage account, a credit card account, or the like), the processor may use the likelihood determined at step 1412 to set one or more parameters for the account. In such an example, the likelihood may be used to determine an interest rate for the account, a margin requirement for the account, an options trading level for the account, or the like. In another example, if the new transaction is a brokerage trade, the processor may use the likelihood determined at step 1412 for initializing settlement of the trade. In yet another example, if the new transaction is a portfolio rebalancing, the processor may use the likelihood determined at step 1412 for approving the rebalancing, adjusting the rebalancing, or the like.

Method 1400 may include additional steps. For example, method 1400 may incorporate traditional authorization in combination with step 1413. In one example, method 1400 may include identifying one or more indicators from the new transaction and authorizing the new transaction when the one or more indicators match expected values. Additionally or alternatively, method 1400 may include identifying one or more indicators from the new transaction, using the one or more indicators to identify matching wavelets, and authorizing the new transaction when the matching wavelets are in expected locations in the field. Additionally or alternatively, method 1400 may include identifying one or more indicators from the new transaction and using the one or more indicators as inputs to the model(s) for determining the likelihood.

In another example, method 1400 may include requesting manual verification of the new transaction when the likelihood is above a first threshold but below a second threshold. For example, the processor may send one or more messages to one or more parties associated with the new transaction (e.g., a financial institution, an individual, a merchant, or the like) with a request to send confirmation of the new transaction. In such an example, the processor may send a message to a mobile phone and/or email address of the individual to request that the new transaction be verified (e.g., by sending a "Y," "yes," or other affirmative response). Additionally or alternatively, the processor may send a message to a merchant warning that a suspicious transaction has been processed and that the merchant will be denied future transactions if the number of suspicious transactions in a period of time exceeds a threshold.

Additionally or alternatively, method 1400 may include sending a rejection signal or a message indicating the likelihood and/or a reason (e.g., based on the one or more models) for rejection when the likelihood is above (or equal to) the threshold. The processor may send the notification to one or more parties associated with the new transaction (e.g., a financial institution, an individual, a merchant, or the like) and/or to one or more computer systems from which the new transaction was received (e.g., a personal computer such as a desktop computer or mobile phone, a point-of-service system, a financial processing server, a credit bureau server, or the like). Similarly, method 1400 may include sending an acceptance signal or a message indicating the likelihood and/or a reason (e.g., based on the one or more models) for acceptance when the likelihood is below (or equal to) the threshold. The notification may be sent similarly to the rejection signal or message.

The disclosed systems and methods may be implemented on one or more computing devices. Such a computing device may be implemented in various forms including, but not limited to, a client, a server, a network device, a mobile device, a laptop computer, a desktop computer, a workstation computer, a personal digital assistant, a blade server, a mainframe computer, and other types of computers. The computing device described below and its components, including their connections, relationships, and functions, is meant to be an example only, and not meant to limit implementations of the systems and methods described in this specification. Other computing devices suitable for implementing the disclosed systems and methods may have different components, including components with different connections, relationships, and functions.

As explained above, FIG. 15 is a block diagram that illustrates an exemplary detection server 1501 suitable for implementing the disclosed systems and methods. Detection server 1501 may reside on a single server farm or may be distributed across a plurality of server farms.

Figure 15:
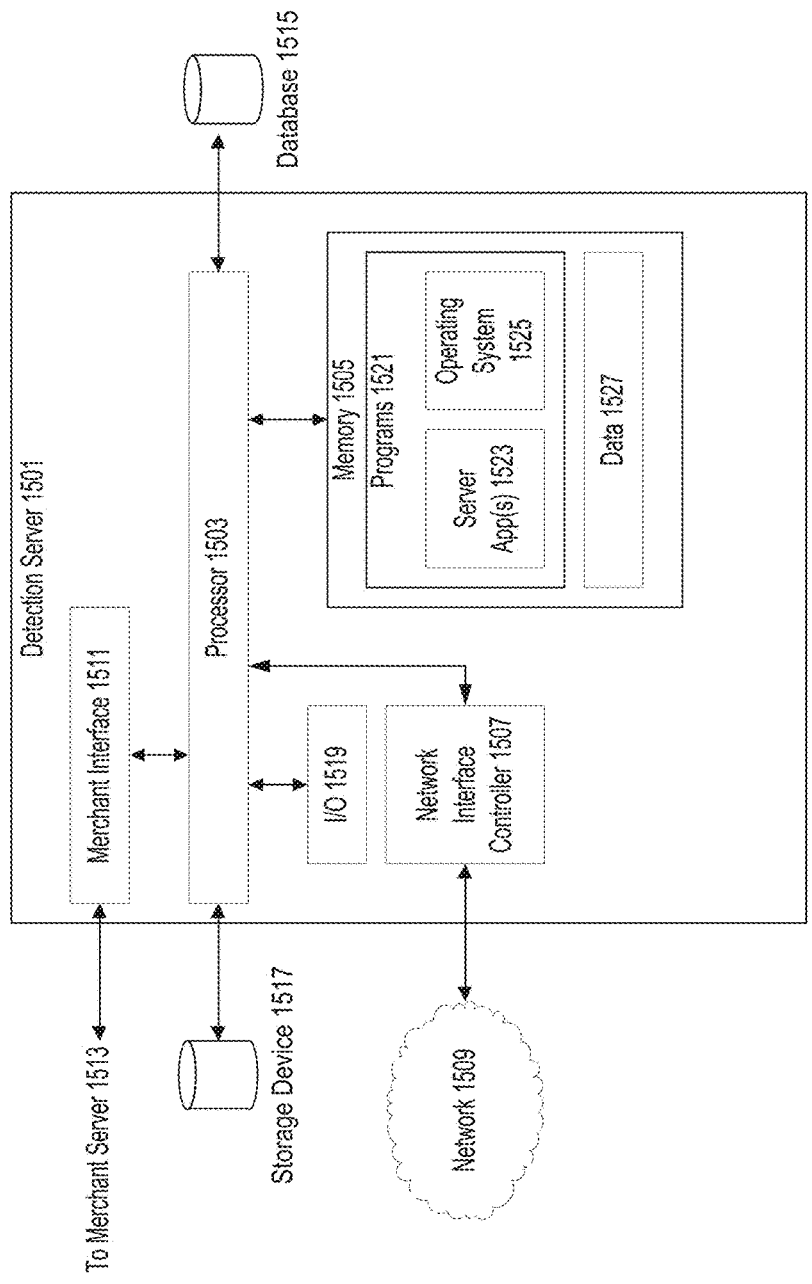
FIG. 15 is a block diagram of an exemplary computing device with which the systems, methods, and apparatuses of the present disclosure may be implemented.

As depicted in FIG. 15, detection server 1501 may include at least one processor (e.g., processor 1503), at least one memory (e.g., memory 1505), and at least one network interface controller (NIC) (e.g., NIC 1507).

Processor 1503 may comprise a central processing unit (CPU), a graphics processing unit (GPU), or other similar circuitry capable of performing one or more operations on a data stream. Processor 1503 may be configured to execute instructions that may, for example, be stored on memory 1505.

Memory 1505 may be volatile memory (such as RAM or the like) or non-volatile memory (such as flash memory, a hard disk drive, or the like). As explained above, memory 1505 may store instructions for execution by processor 903.

NIC 1507 may be configured to facilitate communication with detection server 1501 over at least one computing network (e.g., network 1509). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 1509 over which detection server 1501 is intended to operate. For example, in some embodiments, detection server 1501 may include one or more wireless and/or wired NICs designed to operate over a GSM network, a GPRS network, an EDGE network, a Wi-Fi or WiMax network, and a Bluetooth® network. Alternatively or concurrently, detection server 1501 may include one or more wireless and/or wired NICs designed to operate over a TCP/IP network.

Processor 1503, memory 1505, and/or NIC 1507 may comprise separate components or may be integrated in one or more integrated circuits. The various components in detection server 1501 may be coupled by one or more communication buses or signal lines (not shown).

As further depicted in FIG. 15, detection server 1501 may include a merchant interface 1511 configured to communicate with one or more merchant servers (e.g., merchant server 1513). Although depicted as separate in FIG. 15, merchant interface 1511 may, in whole or in part, be integrated with NIC 1507.

As depicted in FIG. 15, detection server 1501 may include and/or be operably connected to a database 1515 and/or a storage device 1517. Database 1515 may represent a wavelet database or other digital database, which may be stored, in whole or in part, on detection server 1501 and/or, in whole or in part, on a separate server (e.g., one or more remote cloud storage servers). Storage device 1517 may be volatile (such as RAM or the like) or non-volatile (such as flash memory, a hard disk drive, or the like).

I/O module 1519 may enable communications between processor 1503 and memory 1505, database 1515, and/or storage device 1517.

As depicted in FIG. 15, memory 1505 may store one or more programs 1521. For example, programs 1521 may include one or more server applications 1523, such as applications that facilitate graphic user interface processing, facilitate communications sessions using NIC 1507, facilitate exchanges with merchant server 1513, or the like. By way of further example, programs 1521 may include an operating system 1525, such as DRAWIN, RTXC, LINUX, iOS, UNIX, OS X, WINDOWS, or an embedded operating system such as VXWorkS. Operating system 1525 may include instructions for handling basic system services and for performing hardware dependent tasks. In some implementations, operating system 1525 may comprise a kernel (e.g., UNIX kernel). Memory 1505 may further store data 1527, which may be computed results from one or more programs 1521, data received from NIC 1507, data retrieved from database 1515 and/or storage device 1517, and/or the like.

Each of the above identified instructions and applications may correspond to a set of instructions for performing one or more functions described above. These instructions need not be implemented as separate software programs, procedures, or modules. Memory 1505 may include additional instructions or fewer instructions. Furthermore, various functions of detection server 1501 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for detecting anomalies between new wavelets and fields of previous wavelets, the system comprising:
   one or more memories storing instructions; and
   one or more processors configured to execute the instructions to:
     receive a new wavelet,
     convert the wavelet to a tensor using an exponential smoothing average,
     calculate a difference field between the tensor and a field having one or more previous wavelets represented as tensors,
     perform a weighted summation of the difference field to produce a difference vector,
     apply one or more models to the difference vector to determine a likelihood of the new wavelet representing an anomaly, and
     add the new wavelet to the field when the likelihood is below a threshold.

2. The system of claim 1, wherein at least one of the one or more models is specific to at least one of a particular identifier, a particular location, and a particular time of day.

3. The system of claim 1, wherein converting the wavelet to a tensor includes applying a discrete wavelet transform.

4. The system of claim 3, wherein the discrete wavelet transform includes a filter bank comprising a plurality of convolutional-accumulators.

5. The system of claim 4, wherein the convolutional accumulators are configured to accumulate using base e.

6. The system of claim 4, wherein the discrete wavelet transform includes the exponential smoothing average in the filter bank.

7. The system of claim 1, wherein the one or more models comprise a plurality of neural networks integrated into a deep field network.

8. The system of claim 1, wherein the threshold is predetermined.

9. The system of claim 1, wherein the threshold is dynamically determined based on the one or more models.

10. The system of claim 1, wherein the one or more models are selected based on coefficients included in the tensor.

11. The system of claim 1, wherein the likelihood is determined based on a magnitude of the difference vector and a direction of the difference vector.

12. The system of claim 1, wherein the one or more processors are further configured to receive data and convert the data into the new wavelet.

13. The system of claim 1, wherein the difference field comprises a tensor product of fields.

14. The system of claim 13, wherein the tensor product is applied to a field including only the tensor and the field having one or more previous wavelets represented as tensors.

15. The system of claim 1, wherein the one or more processors use one or more atlases to obtain the field having one or more previous wavelets represented as tensors.

16. The system of claim 15, wherein the one or more atlases map the one or more previous wavelets represented as tensors onto a manifold.

17. The system of claim 1, wherein the difference field comprises a Galois connection between the tensor and the field having one or more previous wavelets represented as tensors.

18. The system of claim 1, wherein the one or more processors use a notch filter when performing the weighted summation.

19. The system of claim 18, wherein the notch filter is configured to filter one or more frequencies.

20. The system of claim 19, wherein the one or more frequencies are selected using the one or more models.

* * * * *